(12) United States Patent
Sheets

(10) Patent No.: US 6,477,250 B1
(45) Date of Patent: Nov. 5, 2002

(54) ADJUSTABLE HYBRID HAVING DIAL TONE ALIGNMENT CONFIGURATION

(75) Inventor: Laurence L. Sheets, St. Charles, IL (US)

(73) Assignee: Westell Technologies, Inc., Aurora, IL (US)

( * ) Notice: Subject to any disclaimer, the term of this patent is extended or adjusted under 35 U.S.C. 154(b) by 0 days.

(21) Appl. No.: 09/357,612

(22) Filed: Jul. 20, 1999

Related U.S. Application Data

(63) Continuation of application No. 08/711,681, filed on Sep. 4, 1996.

(51) Int. Cl.[7] ................................................ H04M 1/58
(52) U.S. Cl. ..................................... 379/404; 379/394
(58) Field of Search ............................... 379/404, 403, 379/345; 333/117

(56) References Cited

U.S. PATENT DOCUMENTS

| | | |
|---|---|---|
| 4,041,252 A | 8/1977 | Cowden |
| 4,278,847 A | 7/1981 | Rizzoa et al. |
| 4,333,133 A | 6/1982 | Pernyeszi |
| 4,368,361 A * | 1/1983 | Chung et al. ............... 379/404 |
| 4,388,500 A | 6/1983 | Regan |
| 4,567,331 A | 1/1986 | Martin |
| 4,787,080 A | 11/1988 | Yamakido et al. |
| 4,812,851 A | 3/1989 | Giubardo |
| 4,918,725 A | 4/1990 | Takahashi |
| 4,961,218 A | 10/1990 | Kiko |
| 4,987,569 A | 1/1991 | Ling et al. |
| 5,034,978 A | 7/1991 | Nhuyen et al. |
| 5,132,963 A | 7/1992 | Ungebroeck |
| 5,204,854 A | 4/1993 | Gregorian et al. |
| 5,249,225 A | 9/1993 | Williams |
| 5,253,291 A | 10/1993 | Naseer et al. |
| 5,280,526 A | 1/1994 | Laturell |
| 5,287,406 A | 2/1994 | Kakuishi |
| 5,333,194 A | 7/1994 | Caesar |
| 5,434,916 A | 7/1995 | Hasegawa |
| 5,504,811 A | 4/1996 | Kiko et al. |
| 5,533,119 A | 7/1996 | Adair et al. |
| 6,343,126 B1 * | 1/2002 | Stelman .................. 379/399.01 |

FOREIGN PATENT DOCUMENTS

EP              0181469        5/1986

OTHER PUBLICATIONS e.g. Handbook of Applicable Mathematics, vol. IV, pp. 666–667, Ed. by Ledermann, Pub. by John Wiley and Sons, (1982).

* cited by examiner

*Primary Examiner*—Forester W. Isen
*Assistant Examiner*—Daniel Swerdlow
(74) *Attorney, Agent, or Firm*—McDonnell Boehnen Hulbert & Berghoff

(57) ABSTRACT

A two-wire line conditioning apparatus utilizing dial tone for alignment. Variable impedances are iteratively adjusted using a multitone calibration signal. The hybrid device filters out dial tone components in measuring the echo of the multitone signal during the variable impedance adjustment. The level of the dial tone is measured to determine the overall gain that is to be inserted on the line by the line conditioning apparatus.

11 Claims, 15 Drawing Sheets

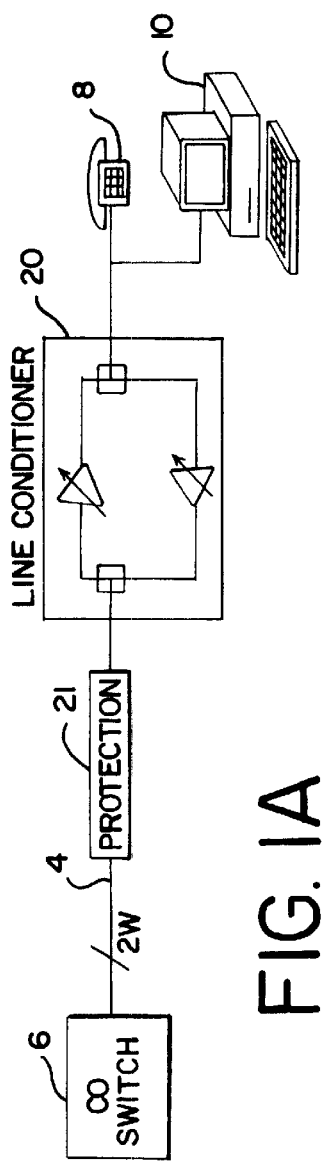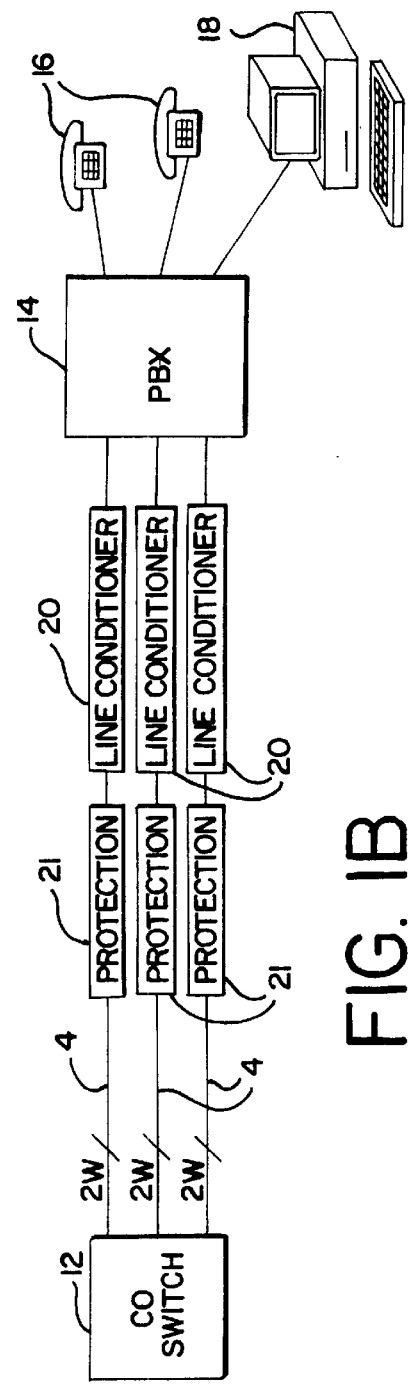

500 HZ PULSE TRAIN, 10% DUTY CYCLE

FIG. 9  RESISTANCE OPTIMIZATION FLOWCHART #1

CALCULATION OF P2
FLOWCHART #2

CALCULATION OF P3
FLOWCHART #3

| NON-LOADED CABLE |||||||||||||
|---|---|---|---|---|---|---|---|---|---|---|---|
| CABLE LOSS | GAIN | EQUALIZ-ATION | CABLE LOSS | GAIN | EQUALIZ-ATION | CABLE LOSS | GAIN | EQUALIZ-ATION | CABLE LOSS | GAIN | EQUALIZ-ATION |
| 4 | 0 | 0 | 5.3 | 1.5 | 2 | 6.6 | 3 | 4 | 7.9 | 5 | 5 |
| 4.1 | 0 | 0 | 5.4 | 2 | 2 | 6.7 | 3.5 | 4 | 8 | 5 | 6 |
| 4.2 | 0.5 | 1 | 5.5 | 2 | 3 | 6.8 | 3.5 | 4 | 8.1 | 5 | 6 |
| 4.3 | 0.5 | 1 | 5.6 | 2 | 3 | 6.9 | 3.5 | 4 | 8.2 | 5.5 | 6 |
| 4.4 | 0.5 | 1 | 5.7 | 2 | 3 | 7 | 4 | 5 | 5.3 | 5.5 | 6 |
| 4.5 | 1 | 2 | 5.8 | 2.5 | 3 | 7.1 | 4 | 5 | 8.4 | 5.5 | 6 |
| 4.6 | 1 | 2 | 5.9 | 2.5 | 3 | 7.2 | 4 | 5 | 8.5 | 5.5 | 6 |
| 4.7 | 1 | 2 | 6 | 2.5 | 3 | 7.3 | 4 | 5 | 8.6 | 5.5 | 6 |
| 4.8 | 1 | 2 | 6.1 | 2.5 | 3 | 7.4 | 4 | 5 | 8.7 | 6 | 6 |
| 4.9 | 1 | 2 | 6.2 | 2.5 | 3 | 7.5 | 4.5 | 5 | 8.8 | 6 | 6 |
| 5 | 1.5 | 2 | 6.3 | 3 | 3 | 7.6 | 4.5 | 5 | 8.9 | 6 | 6 |
| 5.1 | 1.5 | 2 | 6.4 | 3 | 3 | 7.7 | 4.5 | 5 | 9 | 6 | 6 |
| 5.2 | 1.5 | 2 | 6.5 | 3 | 4 | 7.8 | 4.5 | 5 | >9 | 6 | 6 |

| LOADED CABLE ||||||||
|---|---|---|---|---|---|---|---|
| CABLE LOSS | GAIN | CABLE LOSS | GAIN | CABLE LOSS | GAIN | CABLE LOSS | GAIN |
| 4 | 0 | 5.3 | 1.5 | 6.6 | 3 | 7.9 | 4.5 |
| 4.1 | 0 | 5.4 | 2 | 6.7 | 3 | 8 | 4.5 |
| 4.2 | 0.5 | 5.5 | 2 | 6.8 | 3 | 8.1 | 4.5 |
| 4.3 | 0.5 | 5.6 | 2 | 6.9 | 3.5 | 8.2 | 4.5 |
| 4.4 | 0.5 | 5.7 | 2 | 7 | 3.5 | 8.3 | 4.5 |
| 4.5 | 1 | 5.8 | 2 | 7.1 | 3.5 | 8.4 | 5 |
| 4.6 | 1 | 5.9 | 2 | 7.2 | 3.5 | 8.5 | 5 |
| 4.7 | 1 | 6 | 2.5 | 7.3 | 3.5 | 8.6 | 5 |
| 4.8 | 1 | 6.1 | 2.5 | 7.4 | 4 | 8.7 | 5 |
| 4.9 | 1 | 6.2 | 2.5 | 7.5 | 4 | 8.8 | 5.5 |
| 5 | 1.5 | 6.3 | 2.5 | 7.6 | 4 | 8.9 | 5.5 |
| 5.1 | 1.5 | 6.4 | 3 | 7.7 | 4 | 9 | 5.5 |
| 5.2 | 1.5 | 6.5 | 3 | 7.8 | 4 | >9 | 6 |

ADJUSTABLE HYBRID HAVING DIAL TONE ALIGNMENT CONFIGURATION

This is a continuation of U.S. patent application Ser. No. 08/711,681, filed Sep. 4, 1996.

BACKGROUND OF THE INVENTION

A. Field of the Invention

This invention relates generally to the field of telecommunication and the processes by which voice and digital data are transmitted over telephone networks to and from a customer's premises. More particularly, the invention is directed a telephone line conditioner device that is installed in the network between the telephone company network and the lines leading to the customer premises. Basically, the telephone line conditioners described herein are devices to improve the transmission quality of the telephone lines. Line conditioners perform several functions, including amplifying and equalizing the transmission line between the network and customer premises. Because line conditioners are a type of signal repeater located at an intermediate point along a two-wire transmission line, they typically separate the full-duplex (i.e., simultaneous and bidirectional) two-wire transmission lines into two two-wire simplex (unidirectional) circuits. The devices thus contain interface circuitry, commonly known as hybrids, to convert the two-wire full-duplex circuit to two simplex circuits (or four-wire circuit), and to convert the four-wire circuit back to a two-wire circuit. Hybrids originally used transformers to connect the two-wire and four wire circuits. Electronic hybrids were also developed to split and recombine the circuits. The line conditioners amplify and equalize the signals in the simplex circuits between the hybrids.

In a typical POTS application, a line conditioner is located at a customer's residence. The device has two pairs of terminals: one pair is connected to the customer's equipment (the "customer side" or "east side"); the other pair is connected to the phone company's equipment (the "line side" or "west side"). Internally, as indicated above, the line conditioner device has circuitry for the two distinct signal paths: one for signals from the customer side to the line side (or an "east-west" circuit) and one for signals originating from the line side to the customer side (or a "west-east" circuit). Because each pair of terminals is used both for incoming and outgoing signals, one problem associated with line conditioning circuits is that an outgoing signal being directed towards the two-wire system is also simultaneously detected as an input and is retransmitted in the direction from which it originated, thereby causing an echo. Such echos are highly undesirable because they are distracting to the speaker, and can seriously degrade the performance of communications devices such as computer modems and facsimile machines. Effective line conditioning devices must therefore be capable of minimizing echos.

B. Description of the Prior Art

One prior art technique for preventing or suppressing echos is to allow communications in only one direction at a time. Communications formats of this type are commonly referred to as half-duplex. The conditioners inhibit or mute signals from one side when signal energy is detected from the other side. This has the effect of eliminating the possibility of signals returning to the source, but also prevents an individual from hearing speech, or any other sounds, originating from the other party as long as the individual is speaking. The technique also causes dropouts during the switching of the circuits which tends to disrupt conversations. Additionally, this echo suppression technique must be disabled when simultaneous bidirectional communications are required, as is the case with computer modems.

Perhaps the most widely used technique of echo cancellation utilizes a feedback tap from the hybrid interface circuitry to cancel the echo signal, as shown in FIG. 3. The hybrid is adjusted so that the feedback signal at node $N_0$ closely matches the echo signal at node $N_1$ so the feedback signal can be utilized to fully cancel the echo signal. This type of adjustment is commonly referred to as "balancing" the hybrid. The optimum echo cancellation is obtained when the ratio of $R_{FB}/Z_{var}$ exactly matches the ratio of $R_{OUT}/Z_{line}$ because in this "balanced" state, the voltage at the output node $N_1$ is equal to the voltage at the feedback tap $N_0$, thus facilitating echo signal cancellation without impeding the propagation of west-east signals received at the node $N_0$.

The value of $Z_{var}$ which results in the best balance of the hybrid is of course equal to (or proportional to) $Z_{line}$. However, because $Z_{line}$ is a complex parameter derived from transmission line characteristics involving reactive and resistive impedances distributed along the transmission line, it is usually modeled as a simpler circuit using lumped circuit elements. In this way, a circuit realization for $Z_{var}$ that corresponds generally to the estimated $Z_{line}$ is more easily implemented. Various transmission line models have been used within four-wire to two-wire hybrids to reduce echos. Prior art devices which use this type of echo cancellation balance the hybrid by adjusting variable resistors, capacitors and/or inductors in the presence of a tone, typically 2 kHz, which is applied to the hybrid to mimic a transmitted signal. The amount of signal cancellation is then measured using one or more voltage comparators, correlators, or other comparison circuits to achieve the best echo signal cancellation of which the device is capable.

The inventors named herein discovered that the use of a narrow-band signal to balance the hybrid does not result in adequate echo cancellation when the communications circuit is in operation because the impedance of the line varies significantly as a function of frequency. The use of a single tone to balance the hybrid only ensures that frequencies only in that part of the spectrum will be canceled effectively. Previously, this single-tone technique has resulted in acceptable echo cancellation performance for voice communications. Recently, with the wide use of data communications devices, a need for a more accurate balancing has arisen.

Additional prior art line testing devices (known as a "test set", typically used by the phone company technician) use white noise for the calibration signal, but this is also not a good method, as it requires an oscillator or noise generator to make the signal, thus requiring additional components. Additionally, the noise power spectrum has a flat amplitude, and is not weighted to reflect the transmissibility of the voice band.

The present invention uses multitone broad-band measuring of the line impedance properties to provide for a more complete and comprehensive echo reduction over the entire voice band spectrum. Furthermore, the present device accomplishes this task without introducing additional components necessary just for the line balancing. Further, the amplitude of the signals is weighted to reflect the full voice band.

Two prior art patents that disclose line conditioner devices include U.S. Pat. Nos. 4,961,218 and 5,504,811.

SUMMARY OF THE INVENTION

The present invention provides a two-wire line conditioning apparatus having an improved calibration and cancellation circuit and provides an improved calibration method using a multitone calibration signal. The apparatus automatically adjusts an electronic hybrid as part of a calibration procedure so as to eliminate undesirable echo effects when calls are placed along the line. The device provides conditioning for 2-wire switched special service circuits including PBX trunks, WATS, analog data circuits and plain-old telephone service (POTS), as shown in FIG. 1. The electronic hybrid balancing process and echo cancellation circuitry may also be utilized in a circuit for converting four-wire communications systems to two-wire communications systems.

The line conditioning device of the present invention utilizes a multitone signal to simulate the voice frequency spectrum between approximately 500 Hz and 3500 Hz (see FIG. 4, a log plot of C-message load, which provides an indication of which frequencies are more critical to an average listener) to probe the line side with a plurality of tones (e.g., 500, 2000 and 3500 Hz; or 500, 1000, 1500, 2000, 2500, 3000, 3500 Hz). The amplitude of the tones are weighted to reflect the characteristics of modems and voice in the voice band, as shown in FIG. 6. The value of $Z_{var}$ considered to be optimal is that value which minimizes the power of the echo of the weighted multitone signal.

The multitone calibration signal is preferably generated by band pass filtering a rectangular pulse train. This method of generating the calibration signal is simple and economical because it requires relatively few components. By regulating the bandpass filter characteristics and/or the period and duty cycle of the pulse train, the set of frequencies used to analyze echo may be optimized. The weighted multitone signal is injected into the east-west signal path into the electronic hybrid to mimic a signal originating from the customer. The multitone signal is transmitted along the line, but is also simultaneously detected by the initial west-east amplifier within the electronic hybrid. This feedback signal is combined with the cancellation signal from the other branch of the electronic hybrid containing $Z_{var}$. The amount of cancellation obtained is measured by a power level detector. In response to the detected level, the variable impedance $Z_{var}$ of the electronic hybrid is adjusted so as to obtain the minimum power level measurement of the echoed multitone signal. One advantage of using multiple weighted tones over a single frequency or a broadband noise signal is that echo cancellation is significantly improved over the specific range of frequencies of interest. Furthermore, the improved line balancing method and apparatus does not require additional componentry.

BRIEF DESCRIPTION OF THE DRAWINGS

Presently preferred embodiments of the invention are depicted in the drawings, wherein like reference numerals refer to like elements in the various views, and wherein:

FIG. 1A is a block diagram depicting the line conditioner installed in a standard communications circuit at a customer's residence;

FIG. 1B is a block diagram depicting the line conditioner installed in standard communications circuit including a PBX switch;

DETAILED DESCRIPTION OF THE PREFERRED EMBODIMENT

Figure 1C:
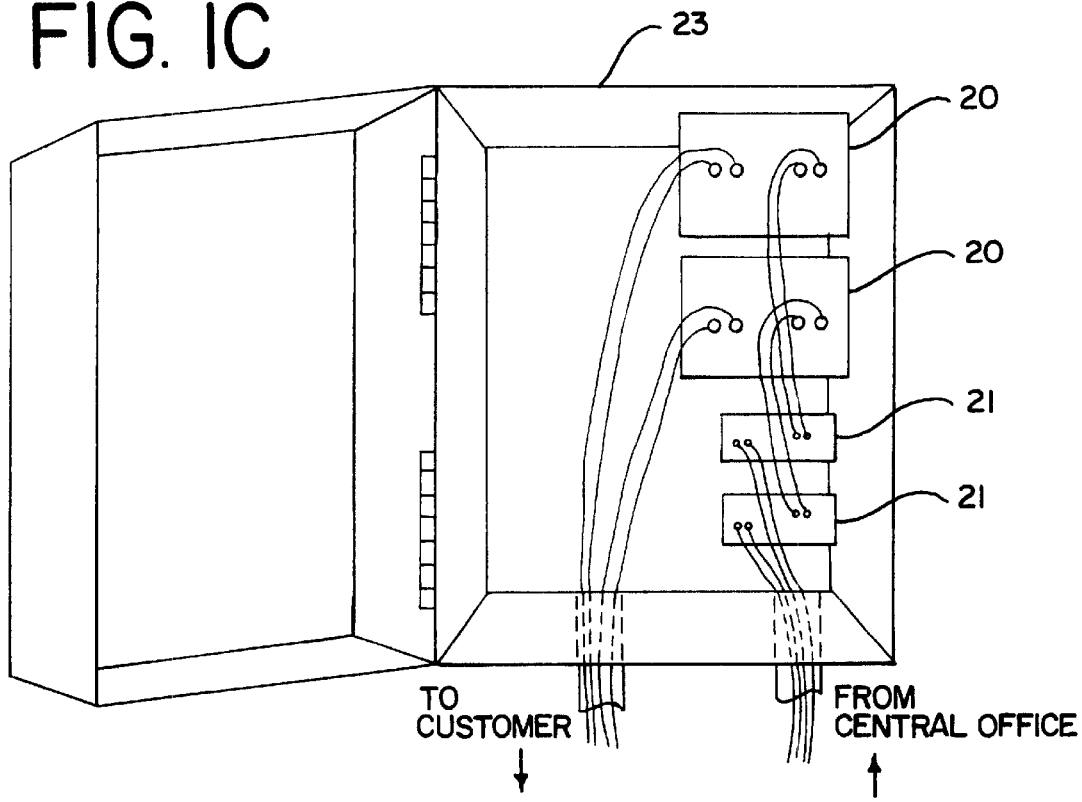
FIG. 1C is a perspective view showing the line conditioner mounted in a standard Keptel enclosure.

FIG. 1A shows the line conditioner 20 installed on a two wire transmission line 4 between a central office switch 6 and a customer drop comprising a telephone 8 and digital computer with modem 10. Other types of communications devices (e.g., facsimile machines) can benefit from line conditioners. Also depicted in FIG. 1B is the line conditioner 20 in a configuration between a central office switch 12 and PBX 14. PBX 14 then provides services to telephones 16 and computer 18.

Figure 2:
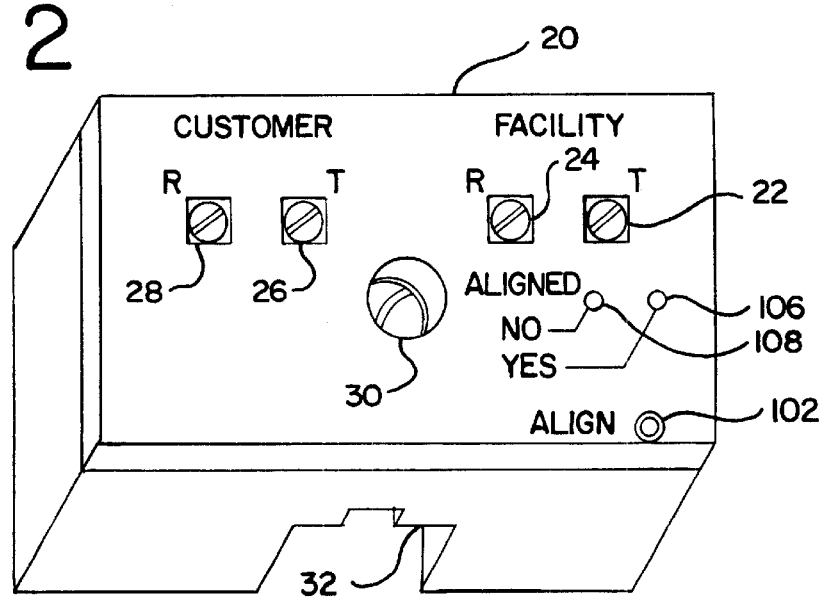
FIG. 2 is a perspective view of the line conditioner unit of FIGS. 1A and B.

With respect to FIG. 2, the line conditioner 20 has west side (or facility) tip 22 and ring 24 terminals and east side (or customer) tip 26 and ring 28 terminals for tip and ring transmission line connections. The tip terminal connections 22, 26 carry the communications signal, and the ring connections 26, 28 provide the signal return path. There is also provided a mounting screw 30 and mounting groove 32 for receiving a mounting bar, so that the line conditioner 20 can be installed at a customer's premises, typically in a Keptel box 23 (FIG. 1C) enclosure (Keptel SNI4600), or on a wall mounting rail. The line conditioner 20 may be provided with two wires (not shown) attached to the line (or facility) screw terminals which can be connected to the protector circuits 21 located below the line conditioner 20.

Figure 3:
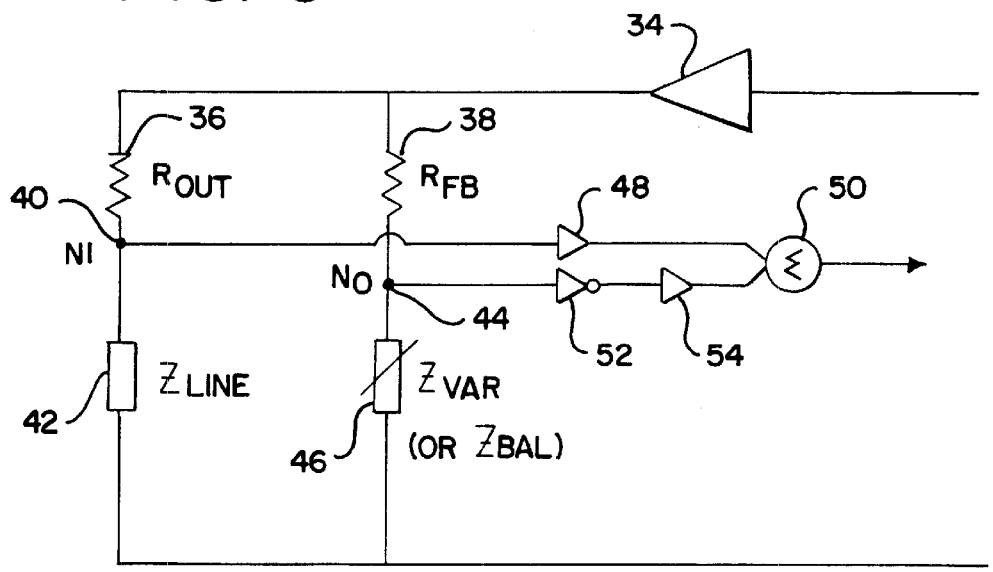
FIG. 3 is a block diagram of a standard electronic hybrid.

FIG. 3 shows a standard electronic hybrid. Output amplifier 34 is connected to the input port of the hybrid at resistors $R_{OUT}$ 36 and $R_{FB}$ 38. Node $N_1$ 40 is the output of the hybrid to the telephone line on the facility side, and $Z_{line}$ 42 represents the impedance of the transmission line. Note also that node $N_1$ is also an input to the hybrid from the telephone line, and thus is an input/output node. Node $N_0$ 44 is the feedback node, and $Z_{var}$ 46 is the variable resistance of the hybrid. Signals received from the line and node $N_1$ pass through receive amplifier 48 and are input to cancellation amplifier 50, (note that the output of cancellation amplifier 50 is the output port of the four-wire portion of the hybrid) and pass through to the remaining portions of the circuit. Signals from output amplifier 34, however, are also picked up from node $N_1$ by receive amplifier 48, creating an echo signal. The feedback signal from node $N_0$ is inverted by invertor 52 and amplified by amplifier 54 and applied to cancellation amplifier 50. When $Z_{var}$ matches $Z_{line}$ (or $Z_{var}=Z_{line}(R_{FB}/R_{OUT})$) the feedback signal will cancel the echo signal.

Figure 7:
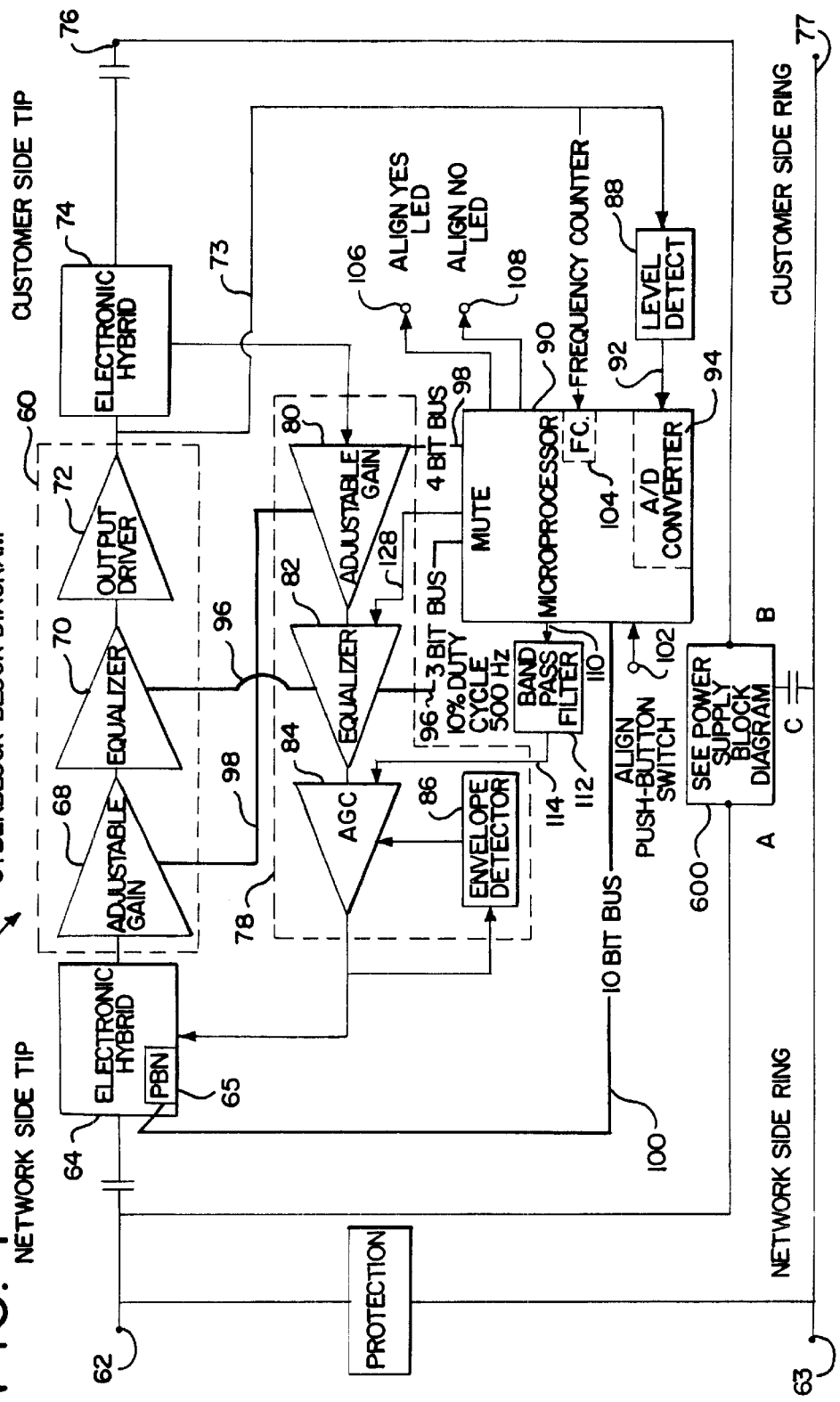
FIG. 7 is a block diagram of a preferred embodiment of the line conditioning unit of the present invention.

FIG. 7 depicts the block diagram of the preferred embodiment of the line conditioner 20 in accordance with a preferred form of the invention. The terminals 22, 24, 26, and 28 of FIG. 2 are electrically connected to west tip 62, west ring 63, east tip 76 and east ring 77, respectively. West-east circuit 60 provides a signal path from west tip terminal connection 62 to the west electronic hybrid 64, through adjustable gain amplifier 68, equalizer 70, to output driver 72, to east electronic hybrid 74, and finally to the east tip 76. The east-west circuit 78 provides a signal path from east tip 76, to the east electronic hybrid 74, through adjustable gain amplifier 80 and equalizer 82, to automatic gain control (AGC) amplifier 84, to the west electronic hybrid 64, and finally to the west tip terminal connection 62. The gain of AGC amplifier 84 is controlled by envelope detector 86 to prevent the output of the AGC amplifier 84 from becoming too large in the presence of certain signals, e.g., DTMF tones. Normal signal levels do not activate the AGC amplifier. Only excessively large signal levels activate the AGC amplifier. The operation of the AGC amplifier prevents hard clipping of the output signal when the output amplifier is over-driven. This allows DTMF receivers to operate normally. Level detector 88 rectifies the AC signal on the output of output driver 72 and provides the rectified DC signal to microprocessor 90 on line 92. Microprocessor 90 has an internal A/D converter 94 for converting the DC level to a binary number for storage and further processing.

The microprocessor 90 is connected to both equalizers 70, 82 by an equalizer control bus 96, preferably a three-bit parallel bus. The microprocessor 90 is also connected to both adjustable gain amplifiers 68, 80 by a gain control bus 98, preferably a four-bit parallel bus. The microprocessor 90 controls the gain and equalization via the busses 96, 98 in a manner that will be described more fully below. The microprocessor 90 is also connected to west hybrid 64 via hybrid control bus 100, preferably a ten-bit parallel bus. Microprocessor 90, via hybrid control bus 100, effectuates the insertion and removal of reactive and resistive impedances within the west hybrid 64, and specifically within the precision balance network 65 (PBN) portion of hybrid 64, thereby adjusting $Z_{var}$ during the balancing procedure. Align button 102 (FIG. 2) provides an initiation signal to microprocessor 90 to begin the alignment procedure. Microprocessor 90 includes a frequency counter 104 that is used to detect the presence of a 1004 Hz one-milliwatt signal sent from the central office telephone switch over west tip 62 during the gain calibration procedure. Microprocessor 90 also controls LEDs 106, 108 to indicate to the installer when alignment has been achieved.

Figure 4:
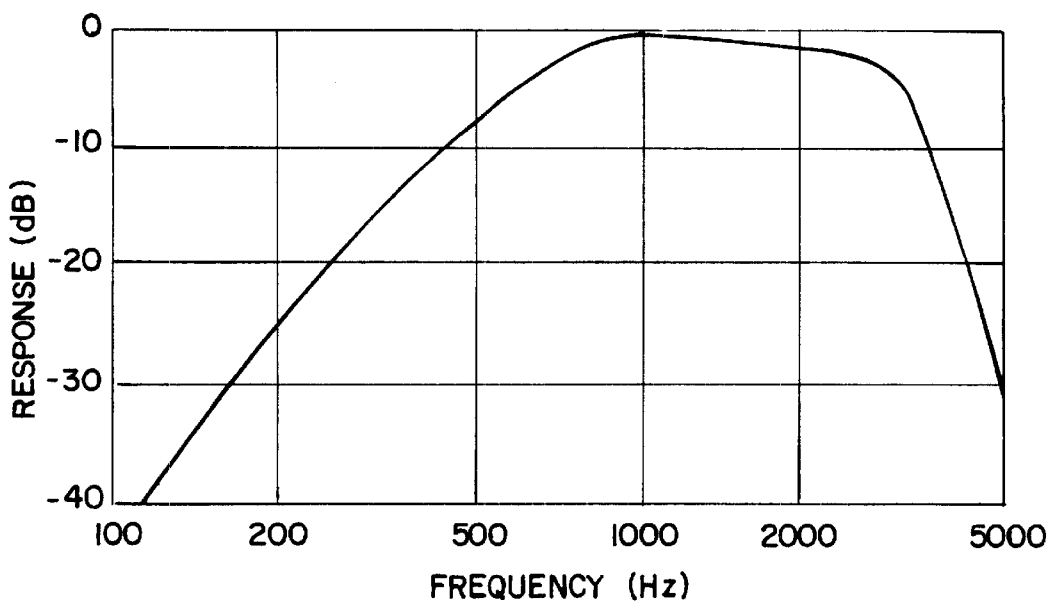
FIG. 4 is a graph of C-message weighting.
Figure 5:
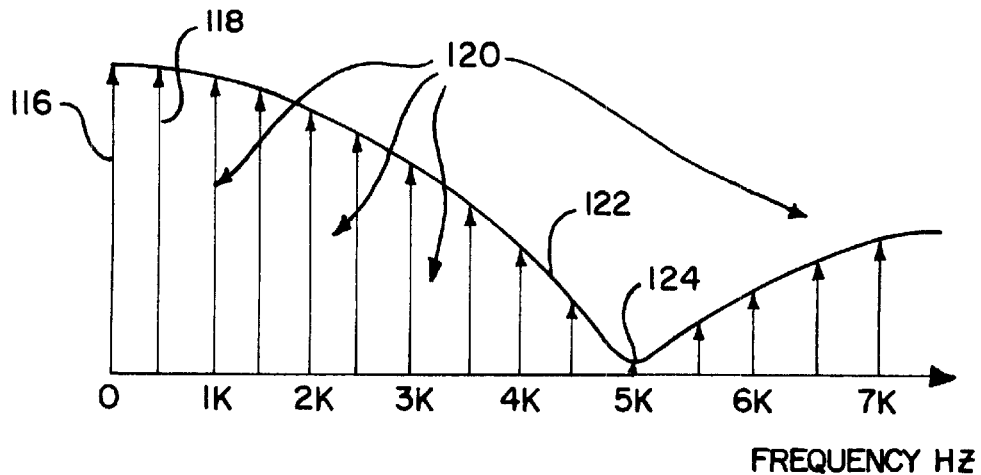
FIG. 5 is a graph of a portion of the frequency spectrum of a pulse train having a frequency of 500 Hz and a 10% duty cycle.
Figure 6:
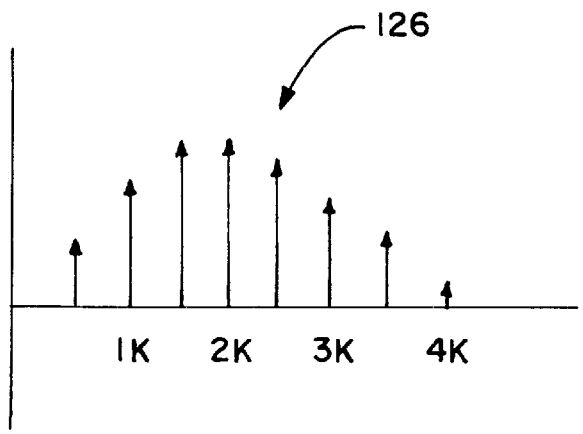
FIG. 6 is a graph of the multitone calibration signal.

During hybrid balancing, the microprocessor 90 generates a pulse train on output 110 that is filtered by band pass filter 112 to obtain the multitone calibration signal on line 114, which is then input to AGC amplifier 84 and passed along in the east-west signal path to west electronic hybrid 64. Preferably, microprocessor 90 sends pulses at 500 Hz having a ten percent duty cycle to band pass filter 112. Such a pulse train has frequency spectrum components comprising a DC signal 116, a 500 Hz tone 118, and its harmonics 120, as depicted in FIG. 5. The magnitude of the spectral components have a $\sin(x)/x$ distribution 122 with its first null point 124 at 5 kHz. The band pass filter 112 shapes the pulse train so that the spectral components are more representative of the signals intended to be transmitted through the line conditioner device. Specifically, band pass filter 112 attenuates the undesirable components and shapes the frequency content to closely correspond to the spectrum of a high speed modem or voice signal, where the voice signal takes into consideration the weighing characteristic of FIG. 4). The calibration signal 126 thus comprises weighted harmonics at 500, 1000, 1500, 2000, 2500, 3000 and 3500 Hz as indicated in FIG. 6.

The portion of the echo signal that is not canceled within west electronic hybrid 64 is passed back through the west-east signal path from hybrid 64, through amplifier 68, equalizer 70, and output driver 72 to hybrid 74. It is important to note that an imbalance in hybrid 74 will cause a secondary echo back through east-west signal circuit 78 that would add to the calibration signal emanating from band pass filter 112 on line 114, and interfere with the measurement and balancing of hybrid 64. To prevent secondary echos during calibration, and to prevent signals originating from the customer side equipment from interfering with the balancing of hybrid 64, the east-west circuit 78 is interrupted, or muted, within equalizer 82 under the control of microprocessor 90 via mute line 128. The mute function performed by equalizer 82 is also useful during power-up of the line conditioner 20 to prevent spurious noise signals (common during power-up) from being sent to the customer.

The level detector 88 provides microprocessor 90 with the DC rectified voltage corresponding to the echo signal. Microprocessor 90 converts the voltage to a binary number with A/D convertor 94 to obtain an echo level measurement. Microprocessor 90 then iteratively adjusts west hybrid 64 via hybrid control bus 100 based on the Echo level measurements so as to minimize the echo from west hybrid 64 as detected by level detector 88.

The microprocessor 90 sends a ten bit word to the electronic hybrid 64 on the hybrid control bus 100 to switch in or out resistors or capacitors to minimize echo. The ten bit word sent on the hybrid control bus 100 is selected using the "golden sections" methodology, described below.

Figure 13:
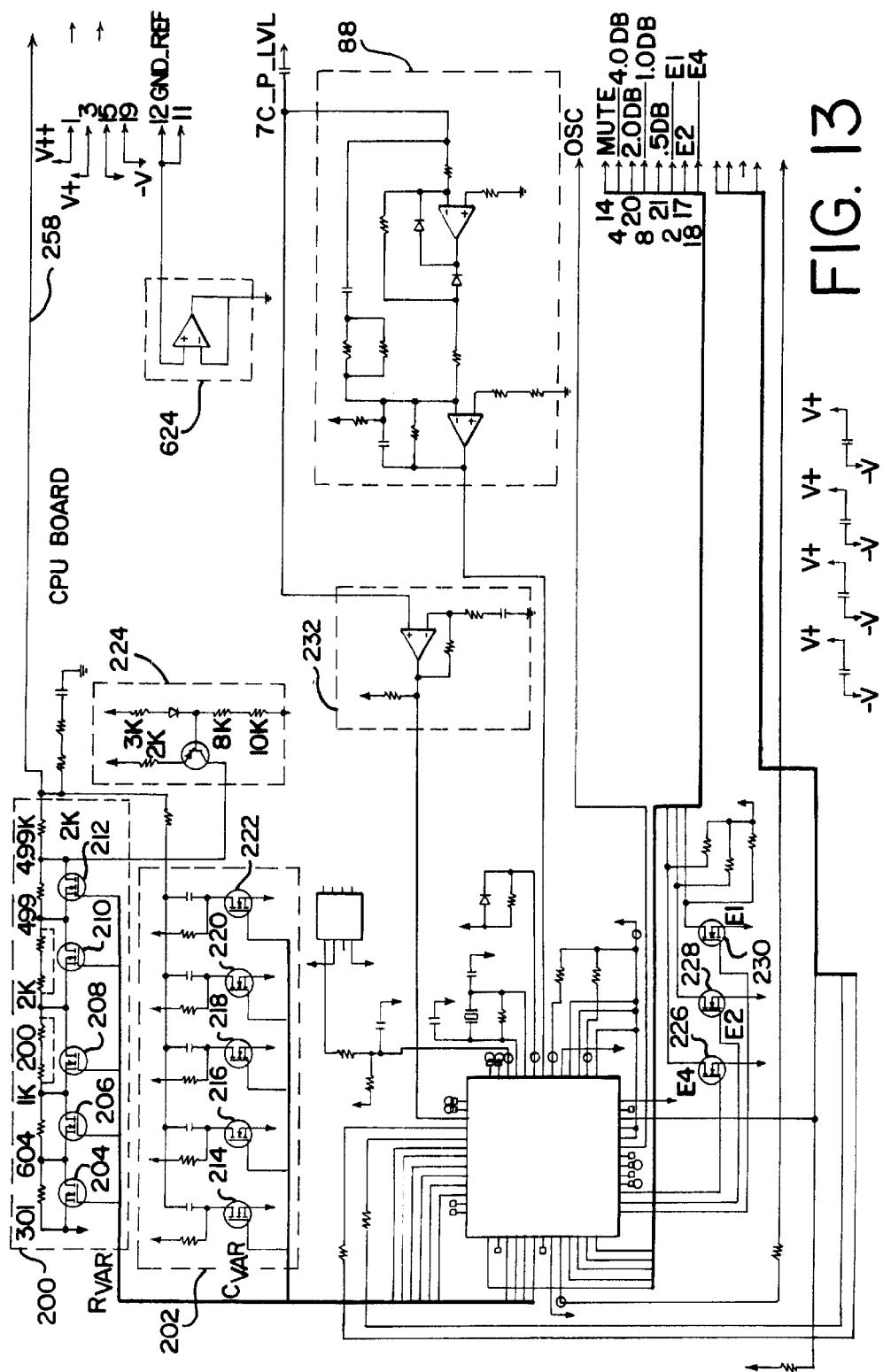
FIG. 13 is a schematic diagram of the CPU board of the line conditioner of FIG. 7.

FIG. 13 shows $R_{var}$ 200 comprising the five resistances $R_1$, $R_2$, $R_4$, $R_8$, and $R_{16}$, are switched into or out of the circuit ($Z_{var}$) by microprocessor 90 through Field Effect Transistors (FET) 204, 206, 208, 210, and 212. Also shown is $C_{var}$ 202 comprising the five capacitors $C_1$, $C_2$, $C_4$, $C_8$, and $C_{16}$, that are switched into or out of the circuit ($Z_{var}$) by microprocessor 90 through FETs 214, 216, 218, 220, and 222. The FETs 204, 206, 208, 210 and 212 are DC biased by current source 224. The AC communications signal is attenuated by the resistors $R_1$–$R_{16}$ if the corresponding FETs are in a nonconductive state. However, if a particular FET is in the conductive state, the corresponding resistor is effectively short circuited, and the signal is passed un-attenuated along to the next FET/resistor combination. In this manner, the five resistance values can be individually selectively placed into the circuit, resulting in thirty two values for $R_{var}$. The resistances $R_1$–$R_{16}$ are chosen so that the overall resistive value can be set to one of thirty two values from 2K ohms to 11.6K ohms in roughly 0.3K ohm increments. (Note that there is a fixed 2 k ohm resistor in series). Similarly, the value of $C_{var}$ can be set to one of thirty two values from zero to 0.0399 micro-farad (with the smallest increment 0.001 micro-Farad) by the microprocessor 90 via FETs 214, 216, 218, 220, and 222. Note that this balance network is scaled up by a factor of five from the line impedance (or external view). The balance resistors are therefore designed to correspond to line resistances from 400 ohms to 2.32K ohms, and the capacitance varies from zero micro-farad to 0.1995 micro-farads.

The microprocessor 90 performs iterative measurements to optimize the settings for capacitors $C_1$–$C_{16}$ and resistors $R_1$–$R_{16}$. Before initiating the alignment step, the installer must connect a DTMF dialer (or "butt-set") to the customer side terminals 26, 28, and dial the central office to request a quiet termination. The installer then must depress the align push-button switch 102 (FIG. 2) to signal microprocessor 90 that hybrid balancing should commence. During the alignment period, the microprocessor 90 will cause align-no LED 108 to flash.

The microprocessor 90 sets the value for $R_{var}$ 200 and $C_{var}$ 202, applies the calibration signal 126 to the west hybrid 64, and obtains an echo measurement for each value of resistance and/or capacitance so selected. The measurements are taken after allowing the signal transients to decay. Presently, the line conditioner is programmed to wait approximately 200 milliseconds, however, the wait period may be shortened to approximately 20 milliseconds. The optimal values for $R_{var}$ 200 and $C_{var}$ 202 can be obtained by a brute force exhaustive search, i.e., every combination of capacitance and resistance can be set and echos measured, but preferably optimization is performed using a search routine referred to as "golden sections". This algorithm treats the resistance $R_{var}$ 200 (and $C_{var}$ 202) as an independent variable, and the echo levels corresponding to the values of $R_{var}$ 200 (and $C_{var}$ 202) as a function to be minimized. The algorithm assumes there is only one minimum value of the function between two points, and that as the independent variable increases, the function monotonically decreases to the minimum then monotonically increases away from the minimum. In other words, for the algorithm to converge to the true minimum, it requires that there are no local minima. This is an acceptable assumption for the purposes of hybrid impedance balancing.

The microprocessor 90 performs the search for optimum $R_{var}$ and $C_{var}$ which result in minimum echo according to the flow charts of FIGS. 9–12. Flowchart #1, FIG. 9, begins with step 500, where a nominal value for $C_{var}$ is chosen. This value has been determined from empirical data to be 0.0199 micro-Farad. At steps 502 and 504, the functional values F(P1) and F(P4), i.e., the echo measurements, are acquired for points one (P1) and four (P4), the minimum and maximum values of $R_{var}$ respectively. The five bits on the portion of hybrid control bus directed to the resistances $R_1$, $R_2$, $R_4$, $R_8$, and $R_{16}$ are indicated parenthetically. At steps 506 and 508, intermediate points P2 and P3 are determined (according to flowcharts #2 and #3 of FIGS. 10 and 11) and their corresponding functional values (echo measurements) F(P2) and F(P3) are acquired. Step 510 determines whether the echo level for P3 is less than the echo level for P2. If F(P3) is less than F(P2), then the minimum value of the function must be at a resistance value somewhere in the segment between P2 and P4, and the old P1 is discarded as being outside the range of interest. Therefore, step 512 reassigns the old P2 to be new P1, and the old P3 to be new P2. The echo levels F(P2) and F(P3) are similarly reassigned. Step 514 then calculates a new P3, and the corresponding echo level F(P3) is acquired. If at step 510 F(P3) is greater than F(P2), then the minimum value of the function must be in the segment somewhere between P1 and P3, and the old P4 is discarded as being outside the range of interest. Step 516 reassigns the old P3 to be new P4, and the old P2 to be new P3, and updates the echo levels as indicated. Step 518 then calculates a new P2. The algorithm continues to eliminate a point (and a search segment) during each iteration, and converges on the minimum. When step 520 determines that the two middle points P2 and P3 are equal, then $R_{var}$ has been determined, and at step 522 the process continues to flowchart #4, FIG. 12.

The capacitance $C_{var}$ is optimized in a substantially similar manner to that described above, where the echo level is considered a function of the dependent variable $C_{var}$. Step 530 sets the value of $R_{var}$ to be the optimal value found at step 522. Steps 532 and 534 acquire functional values F(P1) and F(P4), i.e., the echo level measurements, for points P1 and P4, the minimum and maximum values of $C_{var}$ 202 respectively. The five bits on the portion of hybrid control bus directed to the capacitances $C_1$, $C_2$, $C_4$, $C_8$, and $C_{16}$ are indicated parenthetically. At steps 536 and 538, intermediate points P2 and P3 are determined (according to flowcharts #2 and #3 of FIGS. 10 and 11) and their corresponding functional values (echo level measurements) F(P2) and F(P3) are acquired. Step 540 determines whether the echo level for P3 is less than the Echo level for P2. If F(P3) is less than F(P2), then the minimum value of the function must be at a capacitance value somewhere in the segment between P2 and P4, and the old P1 is discarded as being outside the range of interest. Therefore, step 542 reassigns the old P2 to be new P1, and the old P3 to be new P2. The echo levels F(P2) and F(P3) are similarly reassigned. Step 544 then calculates a new P3 and the corresponding echo level F(P3) is acquired. If, step 540 determines that F(P3) is greater than F(P2), then the minimum value of the function must be in the segment somewhere between P1 and P3, and the old P4 is discarded as being outside the range of interest. Step 546 reassigns the old P3 to be new P4, and the old P2 to be new P3, and updates the echo levels as indicated. Step 548 then calculates a new P2. The algorithm continues to eliminate a point (and a search segment) during each iteration, and converges on the minimum. When step 550 determines that the two middle points P2 and P3 are equal, then $C_{var}$ is set to this value at step 552, and the process of hybrid balancing is completed.

Figure 10:
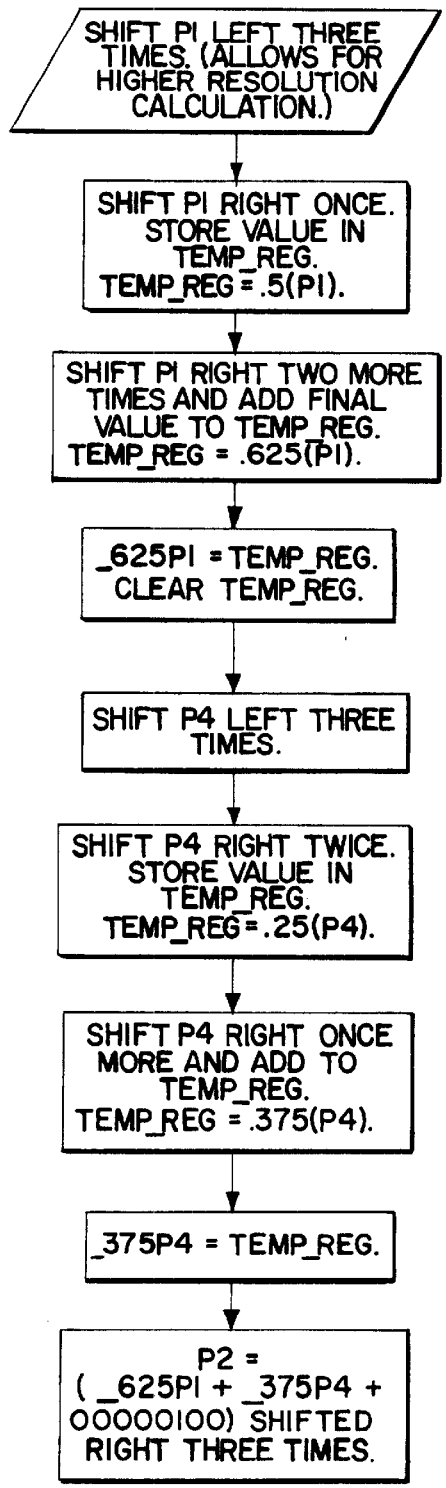
FIGS. 10 and 11 are flowcharts of the process used to calculate intermediate resistance and capacitance values used during the optimization process of FIGS. 9 and 12.
Figure 11:
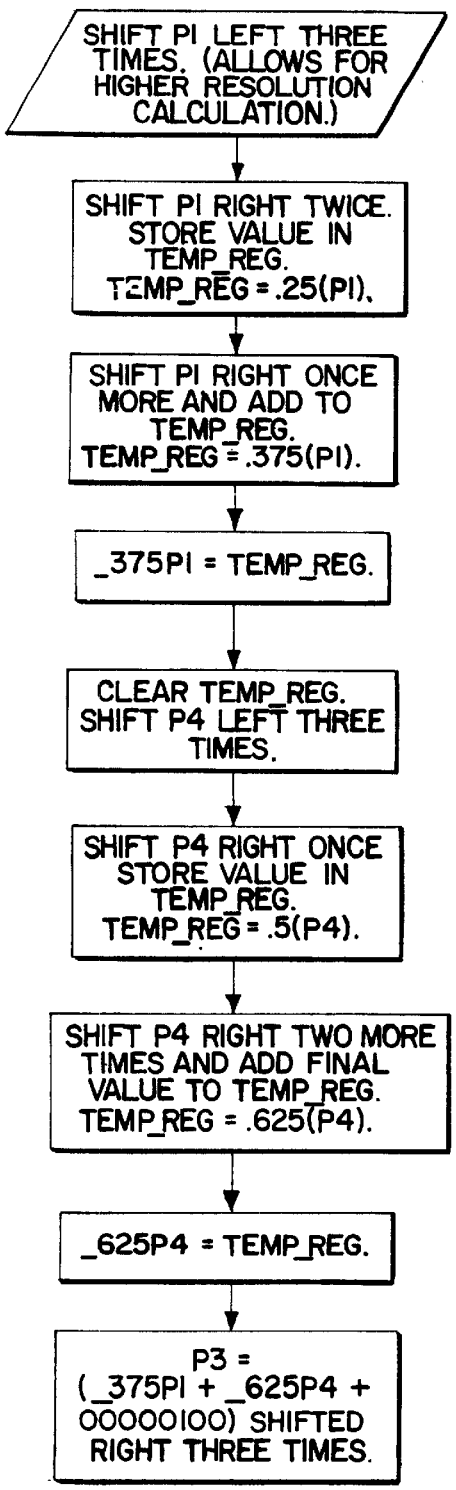
Figure 12:
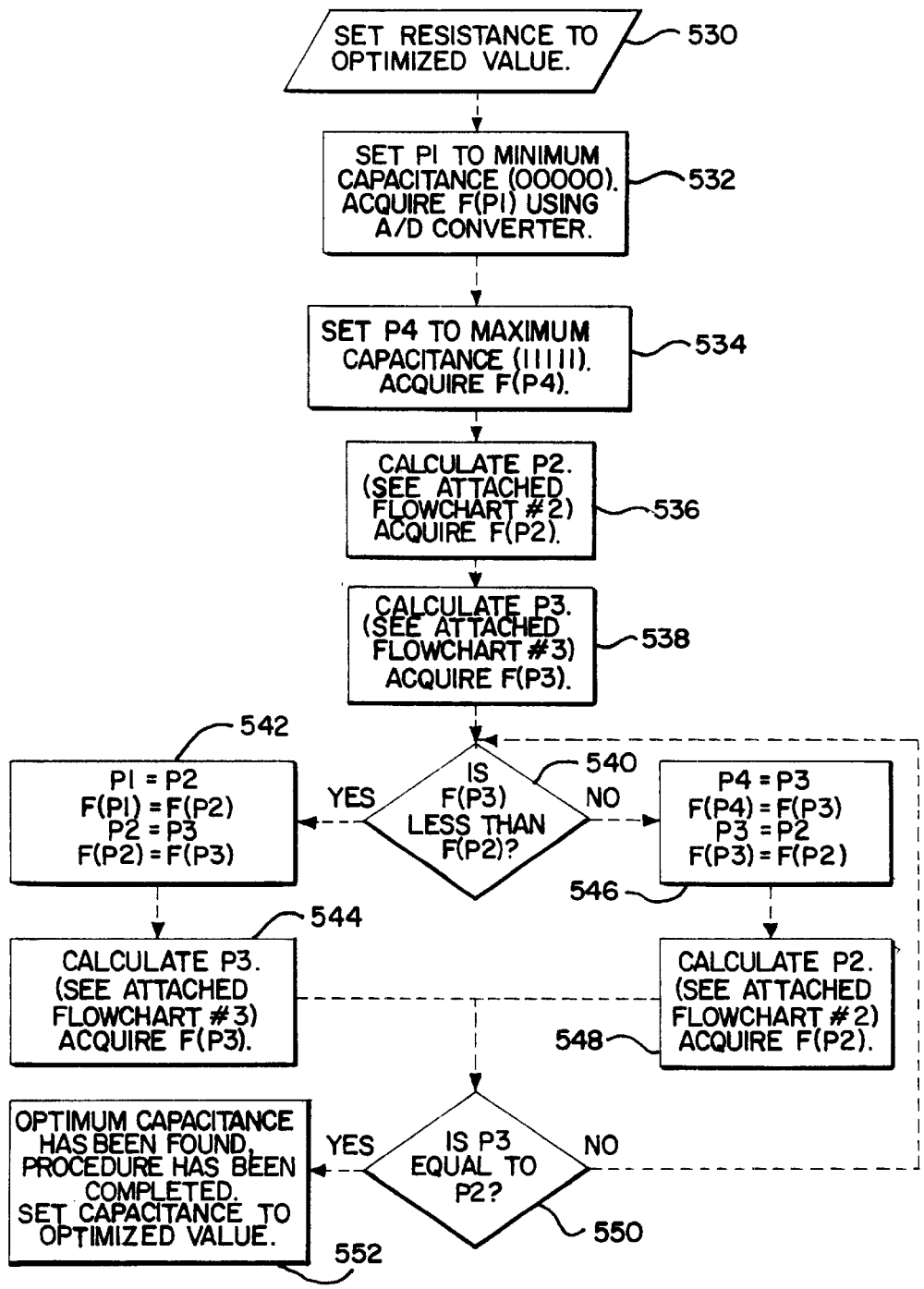
FIG. 12 is a flowchart of the process used by the line conditioner apparatus to optimize the hybrid capacitance.

The calculation of P2 and P3 in the above steps are shown in flowcharts #2 and #3, FIGS. 10 and 11. It has been shown (e.g., Handbook of Applicable Mathematics, Vol. IV, pp. 666–667, Ed. by Ledermann, Pub. by John Wiley and Sons, 1982) that the above algorithm is optimized when P2 and P3 are calculated from the following equations:

$$P2 = 0.618 \cdot P1 + 0.382 \cdot P4 \quad \text{(Eq. 1)}$$

$$P3 = 0.382 \cdot P1 + 0.618 \cdot P4 \quad \text{(Eq. 2)}$$

In the present invention, the above equations are estimated to facilitate efficient digital processing, resulting in an overall decrease in search time. The equations used are:

$$P2 = 0.625 \cdot P1 + 0.375 \cdot P4 \quad \text{(Eq. 3)}$$

$$P3 = 0.375 \cdot P1 + 0.625 \cdot P4 \quad \text{(Eq. 4)}$$

Equations 3 and 4 thus permit the multiplications to be performed using simple additions. For example, one of ordinary skill in the art appreciates that a binary number shifted once to the right is the equivalent of division by two. Two shifts to the right is thus division by four, and so on. Thus, to obtain 0.625·P1, one simply adds P1 right-shifted by one position (0.5·P1) to P1 right-shifted by three positions (0.125·P1). To prevent bits from being shifted out of the register, the control bytes corresponding to P1–P4 are all initially left shifted by three positions before the calculation begins. At the end of the algorithm, a binary 00000100 is added to the byte to round the binary number upwards before right-shifting three positions to obtain the final result.

Because the optimal value for $R_{var}$ is dependent upon the current value of $C_{var}$ the above algorithm could be repeated any number of times to re-optimize $R_{var}$ once $C_{var}$ has been set, and then re-optimize $C_{var}$, etc. It has been found empirically, however, that additional iterations are necessary: the process of setting a nominal value for $C_{var}$, followed by optimization of $R_{var}$, and then optimization of $C_{var}$, produces the same or substantially the same results that repeated iterations provided.

The golden sections algorithm described above reduces the number of echo level measurements required to find the optimal resistance for $R_{var}$ from thirty two (for an exhaustive search) to typically seven or eight, including the initial four points P1–P4. The optimization of $C_{var}$ experiences a similar efficiency, typically seven or eight measurements. At the end of the hybrid balancing procedure, the microprocessor 90 causes the align-no LED 108 (FIG. 2) to stop flashing and remain on steadily.

After west hybrid 64 is balanced, the gain and equalization, or slope, must be determined. It is well understood in the telephone communications art that twisted pair telephone lines suffer from greater loss at higher frequencies. This causes a roll-off in the frequency response characteristic of the line. This is commonly referred to as slope. Roll-off is understood to be a result of the line having relatively little inductance per unit length compared to the capacitance per unit length. In these types of lines, the signals must be equalized to amplify higher frequencies to a greater extent than lower frequencies. This is commonly referred to as adding slope.

On some lines however, inductive loading coils are inserted at regular intervals in an attempt to compensate for the lack of inductance. These coils reduce the high frequency loss tremendously, and there is no need for equalization, or slope compensation.

Whether the line is loaded or not will determine whether equalization is required. Many line conditioners have a manual switch that an installer can use to select non-loaded or loaded cable (i.e., equalizer enabled or disabled). The determination of cable loading is done automatically by the line conditioner of the present invention, and is based on the results of the line balancing operation. It has been determined empirically that if the cable is loaded, then the binary value of $R_{var}$ will be greater than the binary value of $C_{var}$. Note that there is a 2 k ohm resistor in series with $R_{var}$ (which, considering the scale factor of 5 between the line impedance and the balance impedance, corresponds to a 400 ohm resistance). This relationship exists because an unloaded cable has a great deal of capacitance that is not compensated for by the loading coils, and thus, $Z_{var}$ will have a large $C_{var}$ component. Therefore, to determine if equalization is necessary, the binary values of $R_{var}$ and $C_{var}$ are interrogated by the microprocessor 90. If $R_{var}$ is greater than $C_{var}$, then equalization is not required, and the byte on equalizer control bus 96 is set to 000. If, on the other hand $C_{var}>R_{var}$, then equalization is required, and is set during the gain alignment procedure.

Gain and equalization are adjusted by determining the receive level of a 1004 Hz signal sent from the central office. The installer must connect a DTMF dialer (e.g., a butt-set) and dial the number which causes the central office to send out a 1004 Hz signal at 0 dBm (1 milliwatt). This signal enters the line conditioner at west tip 62 and passes through the west-east circuit 60. The frequency counter 104 within microprocessor 90 verifies that the 1004 Hz tone is present, and level detector 88 provides the A/D convertor 94 within microprocessor 90 with the rectified voltage on line 92. Based on the previous determination of cable loading and on the detected level of the 0 dBm 1004 Hz signal, the microprocessor uses a table look-up to determine the proper gain and equalization settings. These tables are shown in FIGS. 18 and 19.

Figures 18, 19, 20:
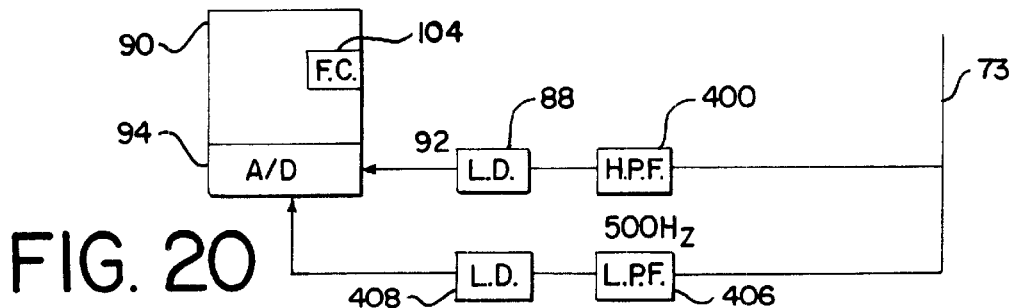
FIG. 18 is a lookup table used to determine the gain and equalization for non-loaded cables.
FIG. 19 is a lookup table used to determine the gain and equalization for loaded cables.
FIG. 20 depicts an alternative embodiment of the line conditioner of FIG. 3.

The table shown in FIG. 18 contains the gain and equalization settings that correspond to particular values of cable loss. The numbers in the gain and equalization columns are the decimal equivalent of the binary logic word applied to the gain control bus 98 and equalizer control bus 96, respectively. The least significant bit on the gain bus 98 is pin 43 on microprocessor 90. The least significant bit of the equalizer control bus 96 is the output of FET 230, controlled by pin 47 on microprocessor 90. When no equalization is required, the FETs within the equalizers 70 and 82 are in the nonconductive state, and the corresponding resistances are placed in the circuit, thus preventing the addition of slope. Therefore, an equalizer setting of "0" from FIG. 18 corresponds to all FETs within the equalizers being in the nonconductive state. There is thus an inverted logic with respect to the equalizer control word from FIG. 18 and the microprocessor data bus. That is, for an equalizer setting of "0", the microprocessor must put positive voltages (normally considered a logic "1") on pins 47–49, thereby causing FETs 226, 228 and 230 to conduct, thereby causing FETs 298, 300, 302, 358, 360 and 362 to turn off, resulting in maximum attenuation of the slope signal in both equalizers 70, 82.

With respect to the variable gain stages 68 and 80, when no gain is required, the gain control FETs 280, 282, 284, 286, 340, 342, 344 and 346 are in the conductive state, and all attenuators are placed in the circuit. Thus, a gain setting of "0" from FIG. 18 or 19 corresponds to all FETs within the variable gain stage being in the conductive state. There is also an inverted logic with respect to the gain control word from FIGS. 18 and 19 with respect to the microprocessor 90 data bus. For a gain setting of "0" the microprocessor must put positive voltages (normally considered a logic "1") on pins 43–46.

In operation, if the detected level of the 1004 Hz, one milli-watt signal, is actually −4.7 dBm, then the cable has imposed a loss of 4.7 dB, which is 0.7 dB more loss than expected (a loss of 4 dB is expected). The gain is set to setting 1 which has the effect of turning off FETs 280 and 340, and the equalization is set to setting 2 which has the effect of turning on FETs 300 and 360.

The gain values are actually obtained by selectively inserting resistors (loss) and then amplifying the resulting signal with a fixed gain amplifier, as will be described more fully below. The gain stage is placed after the attenuators to ensure that signal levels remain with the power rails (typically ±2 volt).

Once gain and equalization are set, the preferred embodiment of the line conditioner verifies that the settings result in the proper signal conditioning by performing another level check of the 0 dBm 1004 Hz signal. The verification is done by measuring the level of the output of driver 72 to ensure signal supplied to the customer tip 76 is at the proper level, and makes any minor corrections to the gain setting as may be required. When alignment is complete, microprocessor 90 causes the align-no LED 108 (FIG. 2) to stop blinking, and illuminates the align-yes LED 106 (FIR. 2).

With reference to FIG. 13, the microprocessor 90 is shown connected to gain control bus 98 on pins 43–46, equalizer control bus 96 on pins 47–49 (via FETs 226, 228 and 230), hybrid control bus 100 on pins 26–30 (for control of $R_{var}$ 200) and pins 31, 35–38 (for control of $C_{var}$ 202). Level detector 88 is connected on pin 14, and buffer 232 is connected to the input to frequency counter 104 on pin 23.

DC current bias source 224 provides FETs 204, 206, 208, 210 and 212 with the necessary bias current to prevent them from becoming reverse biased. The FETs have an internal parasitic diode from the source terminal to the drain terminal. Therefore, when a particular one of FETs 204, 206, 208, 210 and 212 is in the nonconductive, or off state, thereby placing the corresponding resistance $R_1$, $R_2$, $R_4$, $R_8$, or $R_{16}$ in the AC signal path, it is important to keep the drain voltage more positive than the source voltage. Otherwise, the particular FET will begin conducting, thereby providing an AC signal path which effectively removes the resistance from the AC signal path.

For example, without current source 224, if FET 212 is in the off state, AC signals are passed through resistance $R_{16}$. If the AC signal is negative-going, it will be less negative on the source side of FET 212 than on the drain side due to the voltage drop across resistance $R_{16}$. FET 212 will then have a positive voltage from its source to its drain, resulting in the forward bias of the parasitic diode of FET 212. The current flow through FET 212 provides an AC short, thus undesirably shunting the AC signal around resistance $R_{16}$. The novel biasing arrangement shown in FIG. 13 ensures that the FETs 204, 206, 208, 210 and 212 remain properly biased even in the presence of signal fluctuations across the corresponding resistances.

The DC current provided by current source 224 (approximately 270 micro-amperes) flows through resistance $R_{16}$ (again, assuming FET 212 is off), thereby providing a DC voltage drop across resistance $R_{16}$ to prevent the parasitic diode in FET 212 from conducting. If FET 212 is intentionally turned on by microprocessor 90 so as to remove resistance $R_{16}$ from the circuit, then the DC bias current flows through FET 212 and is made available to the next parallel FET/resistance stage.

It also important to note that the FETs used in the present invention require a voltage on the gate terminal that is approximately 2 volts higher than their source terminal. Therefore, in the circuit of FIG. 13, which operates on a supply voltages of ±2 volt, the source terminals of the FETs should not exceed 0 volt (GND_REF). This is particularly important with respect to FET 212 (and FETs 302 and 362) because it is the first FET through which the current will flow, and will have the highest source voltages. For this reason, the highest valued resistance $R_{16}$ is placed in parallel with FET 212 (as opposed to the lowest resistance $R_1$) so that when current is flowing through the resistance, enough voltage is dropped across it to bring the source of FET 212 near 0 volt. If, on the other hand, the lowest resistance, $R_1$ was placed in parallel with FET 212, current source 224 would have to provide considerably more current to cause enough voltage drop across the resistance so as to be impractical. With a reasonable amount of current through the resistor, it would not drop enough voltage and the microprocessor would be unable to turn on FET 212.

The capacitors $C_1$ $C_2$, $C_4$, $C_8$ and $C_{16}$ of FIG. 13 operate in a similar manner, but do not require a DC bias source.

When FETs 214, 216, 218, 220 and 222 are conducting, the capacitors are effectively connected to the reference voltage V− and contribute to $C_{var}$. However, when the FETs are not conducting, the 1 Mohm resistors connected between +V and the drains of the FETs prevent the capacitors from having any significant effect on $C_{var}$.

Figure 14:
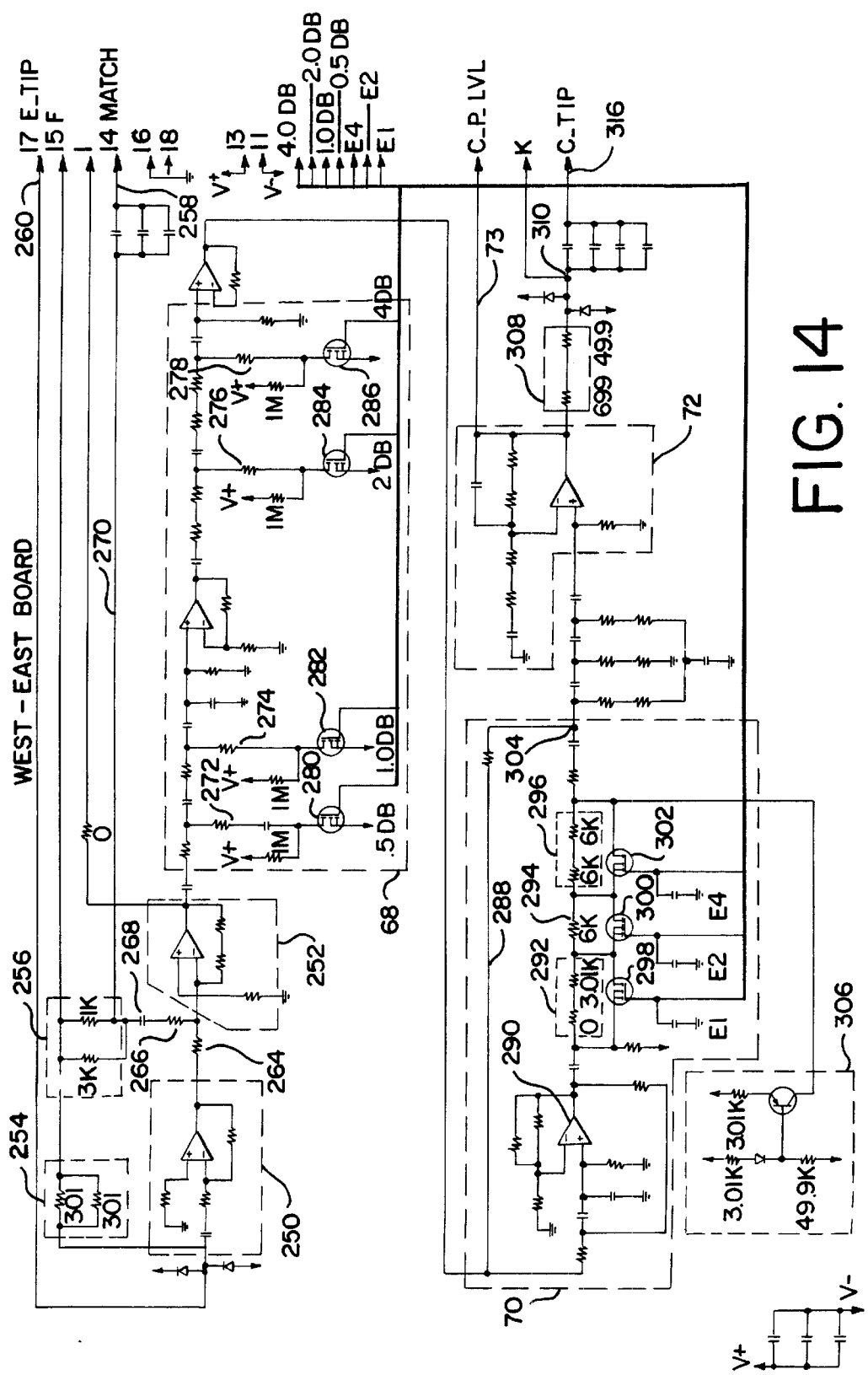
FIG. 14 is a schematic diagram of the west-east board of the line conditioner of FIG. 7.

FIG. 14 shows the west-east circuit 60 comprising initial receive amplifier 250, cancellation amplifier 252, variable gain amplifier 68, equalizer 70, and output amplifier 72. Resistance 254 and resistance 256 form the input port of the top portion of west hybrid 64, with resistance 254 corresponding to $R_{OUT}$, and resistance 256 corresponding to $R_{FB}$ of FIG. 3. Line 258 connects to $R_{var}$200 and $C_{var}$202 of $Z_{var}$ on FIG. 13, and is the equivalent of node $N_0$ in FIG. 3. Line 260 connects to the west tip 62 via line 262 in FIG. 16, and corresponds to node $N_1$ of FIG. 3. The initial receive amplifier 250 receives incoming signals as well as echo signals appearing on line 260. Initial receive amplifier 250 has a gain of −0.5. This signal is effectively input to cancellation amplifier 252 via resistance 264, so that its magnitude at the output of amp 252 is 2.4 times the signal level on the west tip 62. The feedback signal appearing at node 270 is coupled to the cancellation amplifier 252 through resistance 266 and capacitance 268 so that its magnitude at the output of cancellation amplifier 252 is effectively 2.4 times the signal appearing at the feedback node 270 with inverted phase. Thus, if $Z_{var}$ matches $Z_{line}$, the feedback signal will exactly cancel the echo signal at the output to cancellation amplifier 252, and only signals originating from west tip 62 will be passed through west-east circuit 60 (the conceptual equivalent of the above description is that the current signals sum together to cancel each other out at the input to cancellation amplifier).

Note that the output cancellation amplifier 252 is essentially the output port of the electronic hybrid 64 directed to the four-wire side of the communications circuit. This corresponds to the output of cancellation amplifier 50 of FIG. 3.

Variable gain amplifier 68 comprises switchable resistances 272, 274, 276, and 278 which add 0.5 dB, 1 dB, 2 dB and 4 dB of attenuation, respectively, when the corresponding FETs 280, 282, 284, and 286 are turned on. Equalizer 70 comprises a resistive signal path 288 that is flat gain (i.e., it does not affect the slope), and a signal path through high-Q filter 290 that provides 4.5 dB of slope. The output of high-Q amplifier 290 is selectively attenuated by impedances 292, 294, and 296 under the control of microprocessor 90 via equalizer control bus 96 and FETs 298, 300, and 302. The two signal paths are then combined at node 304. Note that the resistances and FETs are DC biased by current source 306 in a manner similar to the biasing of the FETs associated with $R_{var}$, described above. Final output amplifier 72 provides approximately 16 dB of gain. The gain stage is placed after the attenuators in variable gain 68 and equalizer 70 to ensure that signal levels remain with the power rails (typically ±2 volt). The output of amplifier 72 is connected to resistance 308, which corresponds to $R_{OUT}$ of east hybrid 74. The output node 310 of east hybrid 74 corresponds to node $N_1$ of FIG. 3. Node 310 is connected to the east tip 76 via line 316 as shown on FIG. 16. The output of amplifier 72 is also connected to resistance 312 (FIG. 15), which corresponds to $R_{FB}$ of east hybrid 74. The node 314 of east hybrid 74 corresponds to node $N_0$ of FIG. 3.

Figure 15:
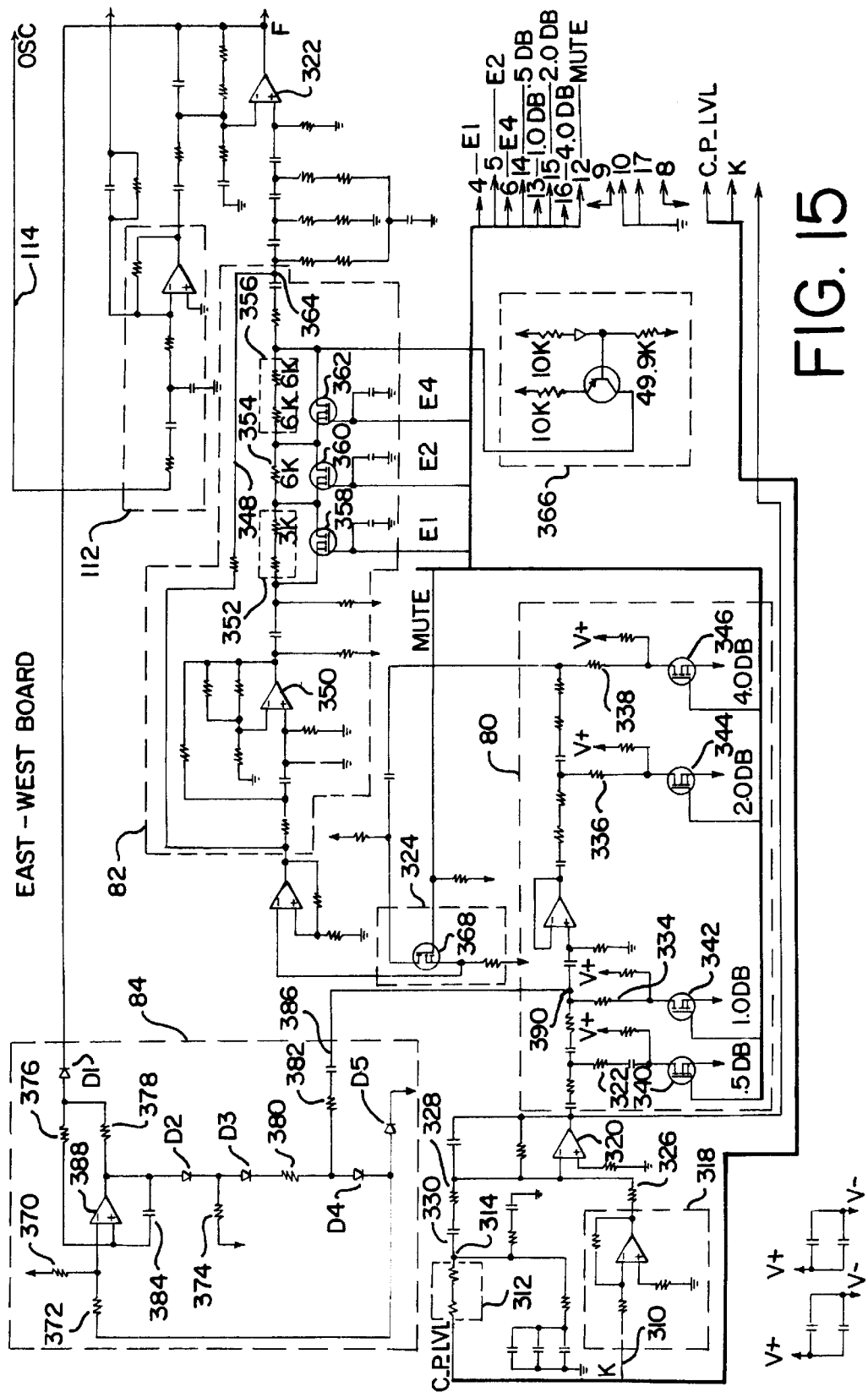
FIG. 15 is a schematic diagram of the east-west board of the line conditioner of FIG. 7.

FIG. 15 shows the east-west circuit 78 comprising initial receive amplifier 318, cancellation amplifier 320, variable gain amplifier 80, equalizer 82, output amplifier 322, mute circuitry 324, and AGC control circuit 84. Also shown is the band pass filter 112 used to shape the pulse train on line 114 from microprocessor 90 to generate the multitone calibration signal 126. Note that east hybrid 74 is not adjustable. Generally, the line towards the customer is comparatively short in length and has standard impedance characteristics. The initial receive amplifier 318 for east hybrid 74 receives incoming signals as well as echo signals appearing on line 310. Amplifier 318 has a gain of −0.5. This signal is input to cancellation amplifier 320 via resistance 326, so that its magnitude at the output of amplifier 320 is 0.5 times the signal level on the east tip 316. The feedback signal appearing on line 314 is coupled to the cancellation amplifier 320 through resistance 328 and capacitance 330 so that its magnitude at the output of amplifier 320 is effectively 0.5 times the signal appearing at the feedback node 314 with an inverted phase. $Z_{bal}$ is not variable, and is designed so that it closely matches $Z_{line}$ towards the customer. This results in the feedback signal canceling the echo signal, and only signals originating from east tip 316 will be passed through east-west circuit 78.

Variable gain amplifier 80 comprises switchable resistances 332, 334, 336, and 338, which add 0.5 dB, 1 dB, 2 dB and 4 dB of attenuation, respectively, when the corresponding FETs 340, 342, 344, and 346 are turned on. Equalizer 82 comprises a resistive signal path 348 that does not affect the slope, and a signal path through high-Q filter 350 which provides 4.5 dB of slope. The output of high-Q filter 350 is selectively attenuated by resistances 352, 354, and 356 under the control of microprocessor 90 via equalizer control bus 96 and FETs 358, 360, and 362. The two signal paths are then combined at node 364. Note that the resistances 352, 354, and 356 and FETs 358, 360, and 362 are DC biased by current source 366 in a manner similar to the biasing of the FETs associated with $R_{var}$, described above. Final output amplifier 322 provides approximately 20 dB of gain.

Note that the signal path from variable gain stage 80 passes through mute circuitry 324 before reaching equalizer 82. During calibration, microprocessor 90 turns off FET 368 to prevent signals originating from the customer, or echo signals from east hybrid 74 from interfering with the echo level measurements.

Automatic gain control circuit 84 comprises diodes $D_1$–$D_5$, resistances 370, 372, 374, 376, 378, 380, and 382, capacitor 384 and 386, and amplifier 388. AGC circuit 84 functions to attenuate the signal path at node 390 to prevent the output of amplifier 322 from becoming too large. Resistances 370 and 372 and diode $D_5$ set up a reference voltage near the negative rail −V for the positive input of amplifier 388. Diode $D_5$ is forward biased. When the output of amplifier 322 becomes too far negative, diode $D_1$ is forward biased. This provides a negative voltage on the negative input of amplifier 388, which in turn causes the output of amplifier 388 to become more positive. Diodes $D_2$ and $D_3$ together with resistances 374 and 380 control the DC bias current through diode $D_4$, which acts as a shunt attenuator. The more forward biased D4 becomes, the more it acts to provide an AC ground through coupling resistor 382 and capacitor 386 to node 390.

The AGC circuit allows DTMF signals originating from the customer side, which tend to be high amplitude signals, to be passed along to the line side without clipping the signal output. This is an important feature, because clipping can introduce harmonics of the DTMF tones which will inhibit some DTMF detectors from functioning properly.

Figure 8:
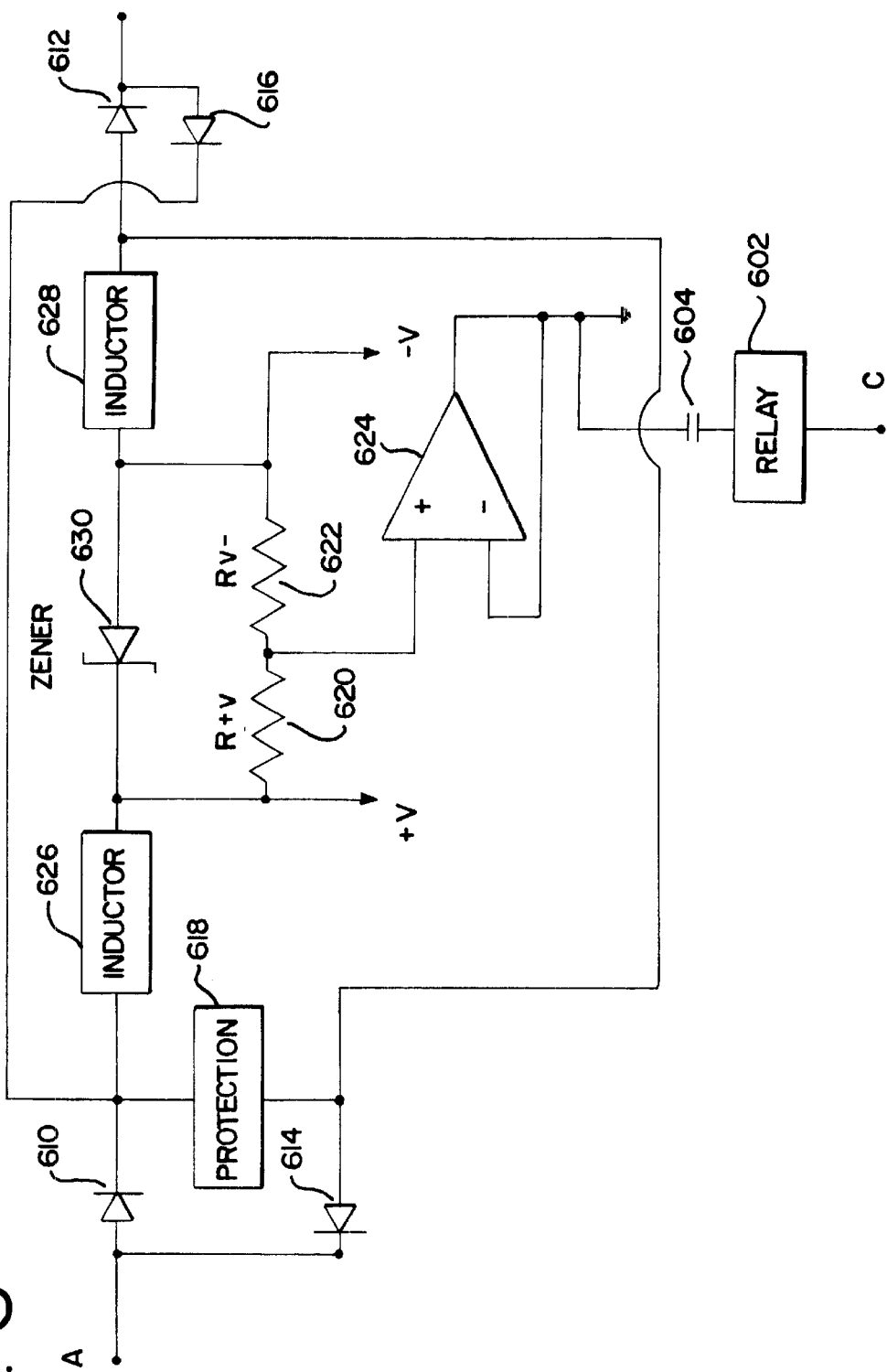
FIG. 8 is a block diagram of the power supply of the line conditioner unit shown in FIG. 7.
Figure 9:
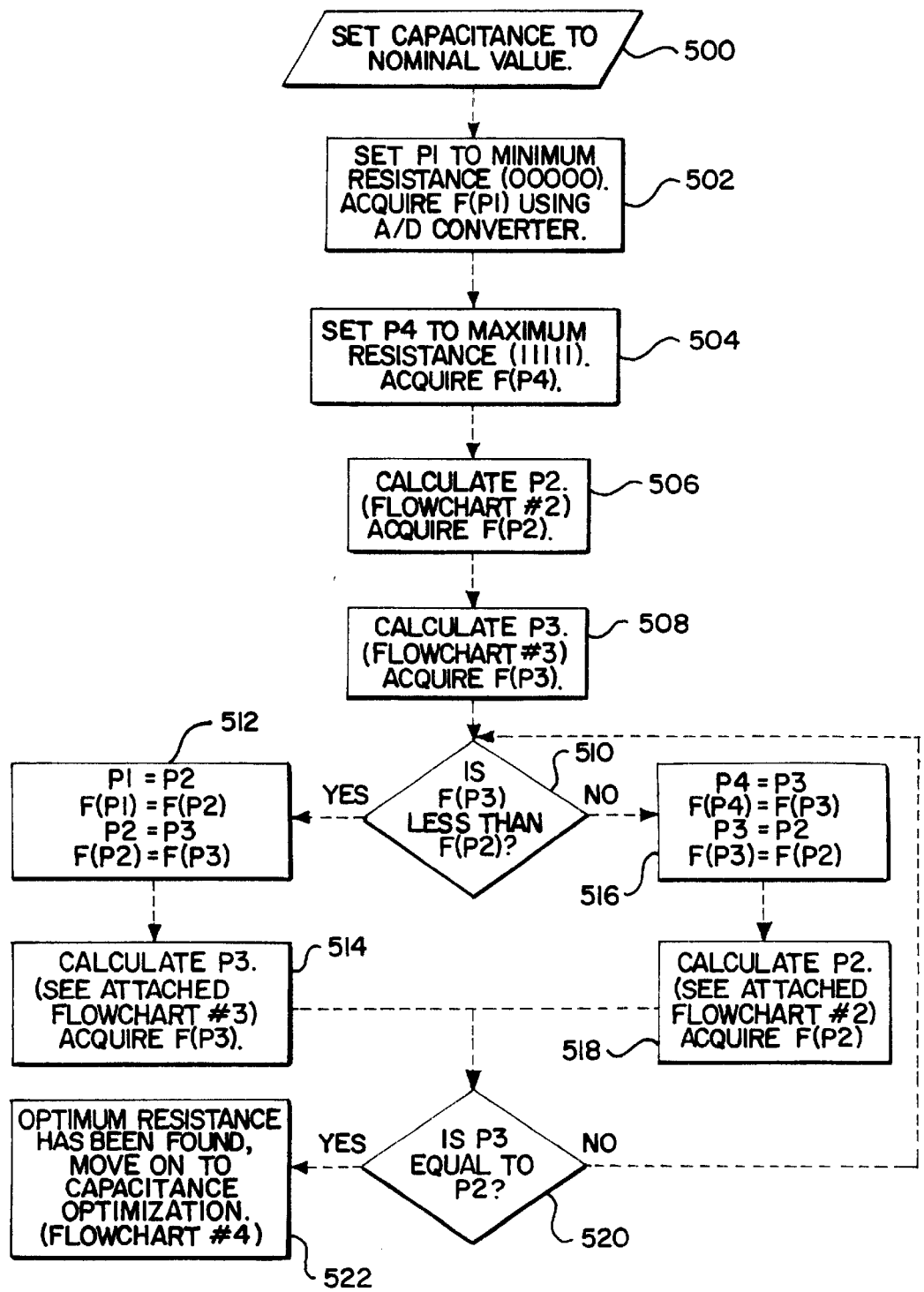
FIG. 9 is a flowchart of the process used by the line conditioner apparatus to optimize the hybrid resistance.
Figure 16:
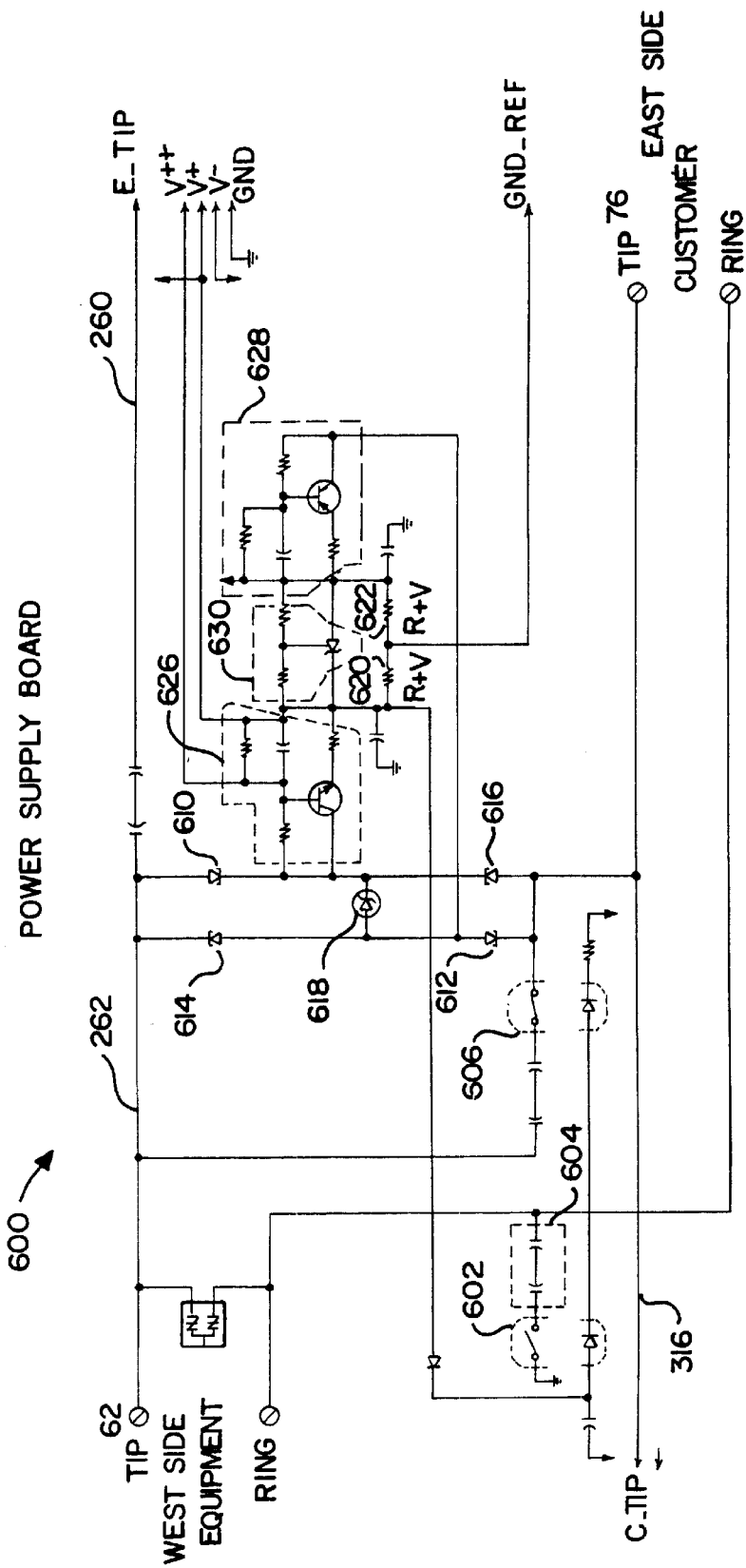
FIG. 16 is a schematic diagram of the power supply board of the line conditioner of FIG. 7.

The power supply 600 is shown in FIGS. 8 and 16. It generates DC voltages of −V, V+, V++, GND and GND_REF. Diodes 610, 612, 614 and 616 provide DC rectification. Diode 618 provides circuit protection, preventing too large a voltage from developing across the power supply 600. The node between $R_{+V}$ 620 and $R_{V−}$ 622 provides the AC ground reference GND_REF, through voltage follower 624 (See FIG. 13). Inductors 626 and 628, together with zener diode 630 provide the supply voltages ±2 volt.

Figure 17:
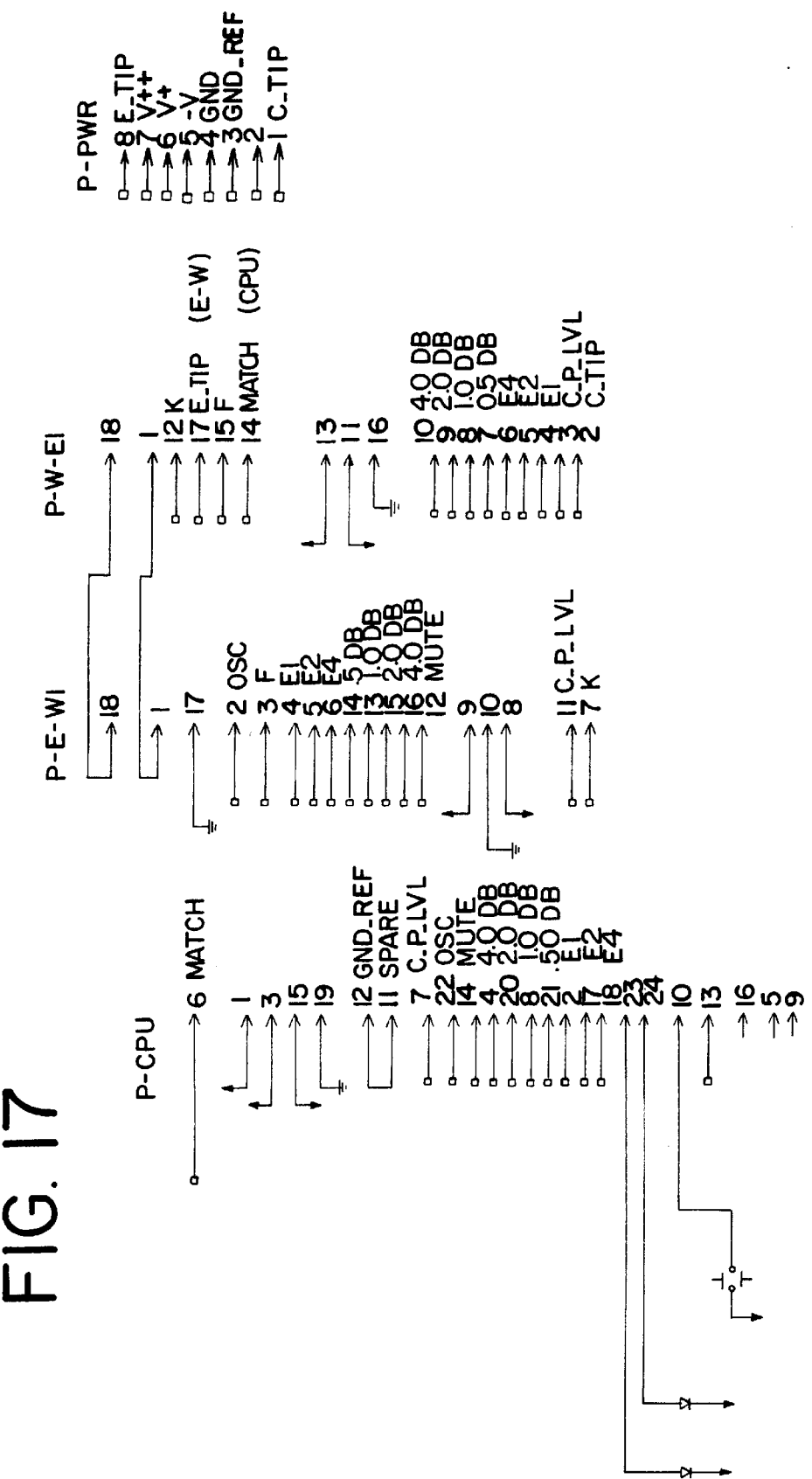
FIG. 17 is a schematic diagram showing additional connections between the line conditioner boards of FIGS. 13–16.

When the customer equipment is on hook, normally closed relay 606 provides a signal path from line tip 62 to customer tip 76 to permit signals such as those associated with caller ID services to pass through the line conditioner when it is not activated. Relay 602 is normally open, and prevents capacitors 604 from being connected between tip and ring, which appear as a fault condition to the central office. FIG. 17 shows additional interconnections between the circuit boards of the line conditioner.

In another preferred embodiment of the line conditioner 20, the hybrid balancing and gain and equalization settings are determined without intervention by an installation technician. The line conditioning device calibrates the hybrid in the presence of dial tone by using a calibration signal that does not have frequency components in common with the dial tone, and by filtering out dial components to prevent them from interfering with the echo level measurements. The line conditioning device then makes use of the dial tone signal from the central office to set the gain and equalization. This allows for automatic line conditioning each time the customer places a call.

The alternative embodiment is depicted in FIG. 20. A dial tone typically comprises two tones, one at 350 Hz, and the other at 440 Hz, each at −13 dBm0 (where the precise tone plan is used). West hybrid 64 is balanced in substantially the same manner; however, the calibration signal is derived in a slightly different manner. It is desirable to use frequencies that are not near the dial tone frequencies. Therefore, the microprocessor generate a pulse train having a frequency of 700 Hz, with a duty cycle of 16.6% (this creates the first null at 4200 Hz, and harmonics of 1400, 2100, 2800 and 3500 Hz). The pulse train is shaped as before to mimic the frequency characteristics of signals to be transmitted over the communications line when it is in operation. To prevent the dial tone frequencies from interfering with the Echo level measurements of the echoed calibration signal, the level detector 88 is preceded by a high pass filter 400, which attenuates signals having frequencies less than about 500 Hz. This effectively removes the dial tone, but allows the echo signal to pass through to level detector 88.

The line conditioner 20 then performs the gain and equalization steps in a substantially similar manner to that described above; however, a technician need not dial the central office to request a one milliwatt, 1004 Hz tone. Rather, the line conditioner utilizes the dial tone to in determine the required gain (and equalization, if the hybrid balancing process resulted in $C_{var} > R_{var}$). Low pass filter 406 allows only the dial tone components to pass through to level detector 408. The output of level detector 408 is sent to the A/D convertor 94 in microprocessor 90 via another input port, line 410. One of ordinary skill in the art will appreciate that a single level detector circuit having selectable inputs may be used. The level of the dial tone is then used to determine the gain and equalization required via lookup tables similar to those of FIGS. 18 and 19.

The preferred embodiment of FIG. 20 can therefore perform simultaneous hybrid balance and gain alignment because the tones do not overlap, and because there are separate filters, level detectors, and A/D ports used for the two procedures.

Microprocessor 90 receives power when the customer goes off hook. The microprocessor 90 performs an alignment each time the customer goes off hook. The microprocessor is capable of generating the pulse train and checking the resulting echo with one detector, while simultaneously checking the receive level of dial tone with the other detector. $R_{var}$ and $C_{var}$ are optimized, and then the gain and equalization look-up is performed based on the values of $R_{var}$ and $C_{var}$ and gain and equalization are inserted.

The preferred embodiments of the present invention are now fully described. The above description, however, is only illustrative of the invention and is not intended to limit the invention in spirit or scope. Only the following claims and their equivalents limit the scope of the invention.

We claim:

1. A method of performing gain alignment and hybrid balancing in a two-wire to four-wire hybrid circuit having variable impedances comprising the steps of:

setting the variable impedances to initial impedance values;

applying a multitone calibration signal across the hybrid in the presence of a dial tone signal;

measuring an echo signal level from a hybrid return signal;

iteratively adjusting the variable impedances until an attenuated echo signal level is attained;

measuring a dial tone signal level from the hybrid return signal; and aligning the gain responsively to the dial tone signal level.

2. The method of performing gain alignment and hybrid balancing according to claim 1 further comprising the step of:

setting the equalization of the transmission line.

3. The method of performing gain alignment and hybrid balancing according to claim 1 wherein said step of measuring the echo signal level further comprises:

filtering the hybrid return signal to attenuate signal components corresponding to the dial tone signal frequencies.

4. The method of performing gain alignment and hybrid balancing according to claim 1 wherein said step of measuring the dial tone signal level further comprises:

filtering the hybrid return signal to attenuate signal components corresponding to an echo of the multitone calibration signal.

5. The method of performing gain alignment and hybrid balancing according to claim 1 wherein the multitone calibration signal comprises distinct tones, said tones being applied simultaneously.

6. The method of performing gain alignment and hybrid balancing according to claim 5 wherein the distinct tones of the multitone calibration signal are at higher frequencies than the dial tone signal frequencies.

7. The method of performing gain alignment and hybrid balancing according to claim 1 wherein said steps of measuring the echo signal level and of measuring the dial tone signal level are performed simultaneously.

8. An apparatus for automatic line conditioning and two-wire to four-wire communication line conversion comprising:

a hybrid circuit having a simplex transmit port, a simplex receive port, and duplex port;

a first filter connected to said simplex receive port for filtering signal components of a received signal from a central office corresponding to a dial tone signal are attenuated;

a first level detector connected to said first filter for measuring the echo level of the received signal from the first filter;

a multitone signal generator connected to said simplex transmit port for applying a multitone calibration signal comprising distinct tones, the tones being applied simultaneously;

a second filter connected to said simplex receive port for filtering signal components of the received signal corresponding to the multitone calibration signal are attenuated;

a second level detector connected to said second filter for measuring the dial tone level of the received signal from the second filter;

a controller circuit for performing simultaneous gain alignment and hybrid balancing, wherein said controller circuit comprises an analog to digital converter having first and second input ports for receiving signals from the first and second level detectors, respectively, said first level detector signal being utilized by the controller circuit for hybrid balancing and said second level detector signal being utilized for gain alignment.

9. The apparatus according to claim 8 wherein said controller circuit is a microprocessor.

10. The apparatus according to claim 8 wherein said first filter is a high-pass filter.

11. The apparatus according to claim 8 wherein said second filter is a low-pass filter.

* * * * *